United States Patent [19]

Ishida et al.

[11] Patent Number: 5,049,874

[45] Date of Patent: Sep. 17, 1991

[54] PAGING RECEIVER WITH EXTERNAL MEMORY MEANS

[75] Inventors: Shinjiro Ishida, Kodaira; Yoshiaki Mukai, Oome, both of Japan

[73] Assignee: Casio Computer Co., Ltd., Tokyo, Japan

[21] Appl. No.: 408,105

[22] Filed: Sep. 15, 1989

[30] Foreign Application Priority Data

Sep. 20, 1988 [JP] Japan .......................... 63-123315[U]
Sep. 20, 1988 [JP] Japan .......................... 63-123316[U]
Sep. 20, 1988 [JP] Japan .......................... 62-123317[U]

[51] Int. Cl.$^5$ ............................................ H04B 7/00
[52] U.S. Cl. ........................... 340/825.44; 340/825.26; 340/825.27; 340/311.1
[58] Field of Search ........... 340/311.1, 825.44, 825.47, 340/825.52, 825.26, 825.27; 379/56, 57, 58, 59, 62; 455/31, 32, 33, 38, 347, 348, 349, 351

[56] References Cited

U.S. PATENT DOCUMENTS

| | | | |
|---|---|---|---|
| 4,283,796 | 8/1981 | Hughes | 455/351 |
| 4,438,433 | 5/1984 | Smout et al. | 340/825.44 |
| 4,521,776 | 6/1985 | Smoot et al. | 340/825.44 |
| 4,639,225 | 1/1987 | Washizuka | 455/347 |
| 4,706,272 | 11/1987 | Nishimura et al. | 340/825.44 |
| 4,742,516 | 5/1989 | Yamaguchi | 340/825.44 |
| 4,818,987 | 4/1989 | Ido et al. | 340/825.47 |
| 4,845,491 | 6/1989 | Fascenda et al. | 340/825.44 |
| 4,879,759 | 11/1989 | Matsumoto et al. | 455/348 |

FOREIGN PATENT DOCUMENTS

| | | | |
|---|---|---|---|
| 0301740 | 2/1989 | European Pat. Off. | 379/58 |
| 0048903 | 3/1989 | Japan | 455/347 |

Primary Examiner—Palmer C. DeMeo
Assistant Examiner—Dervis Magistre
Attorney, Agent, or Firm—Frishauf, Holtz, Goodman & Woodward

[57] ABSTRACT

A paging receiver includes a receiver main body and a card-like ROM. The receiver main body includes a receiver circuit for receiving a paging signal, reception controllers for ON/OFF-containing the receiving circuit on the basis of reception control data, address comparators for checking whether a calling signal received in accordance with a reception control signal is assigned to the receiver, a CPU for fetching a message following the calling signal determined to be assigned to the receiver by the address comparators, a message memory for storing a received message, and a display for displaying the message stored in the message memory. The card-like ROM is detachably mounted in the receiver main body, stores at least a part of the reception control data, and supplies the reception control data stored therein to at least one of the reception controller and the address comparator while it is mounted in the receiver main body. The reception control data includes at least one of a frame number representing a frame to be received, an address for receiving a message, and remaining reception number data representing the number of times capable of receiving contract information.

24 Claims, 20 Drawing Sheets

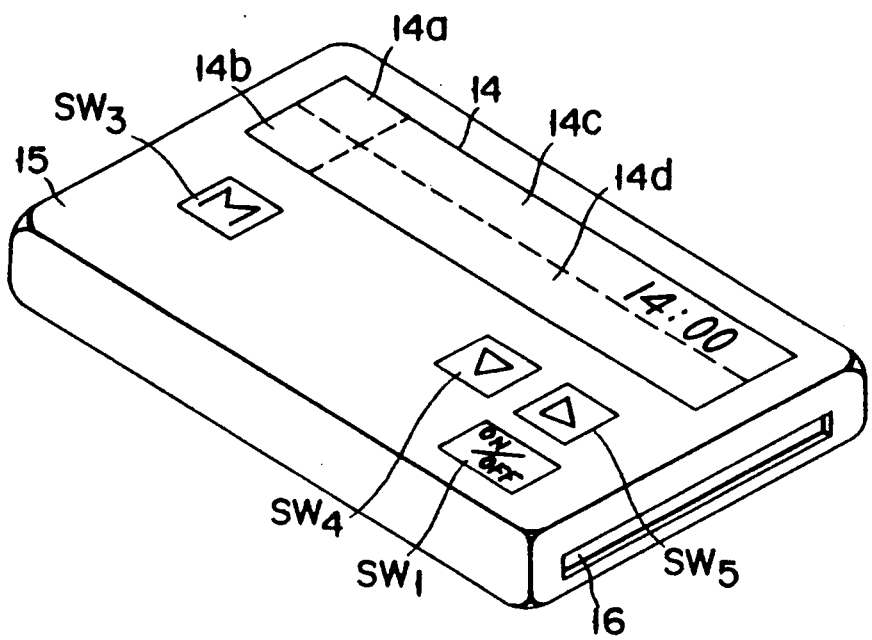
F I G. 3A
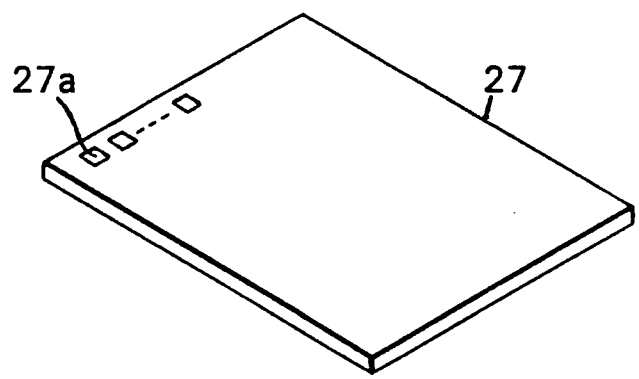
F I G. 3B

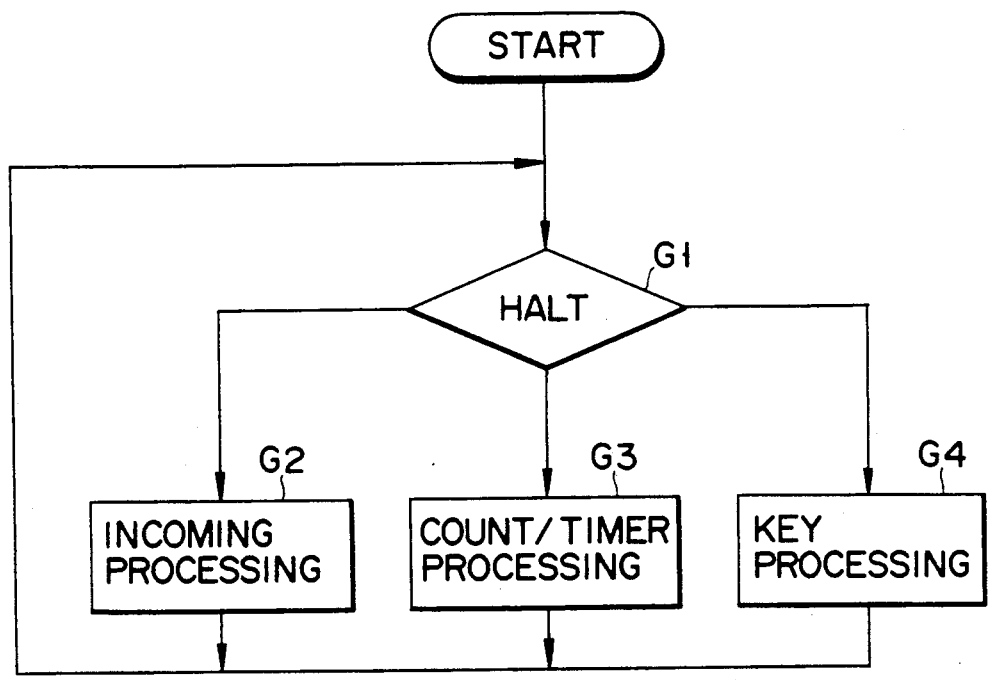
F I G. 12

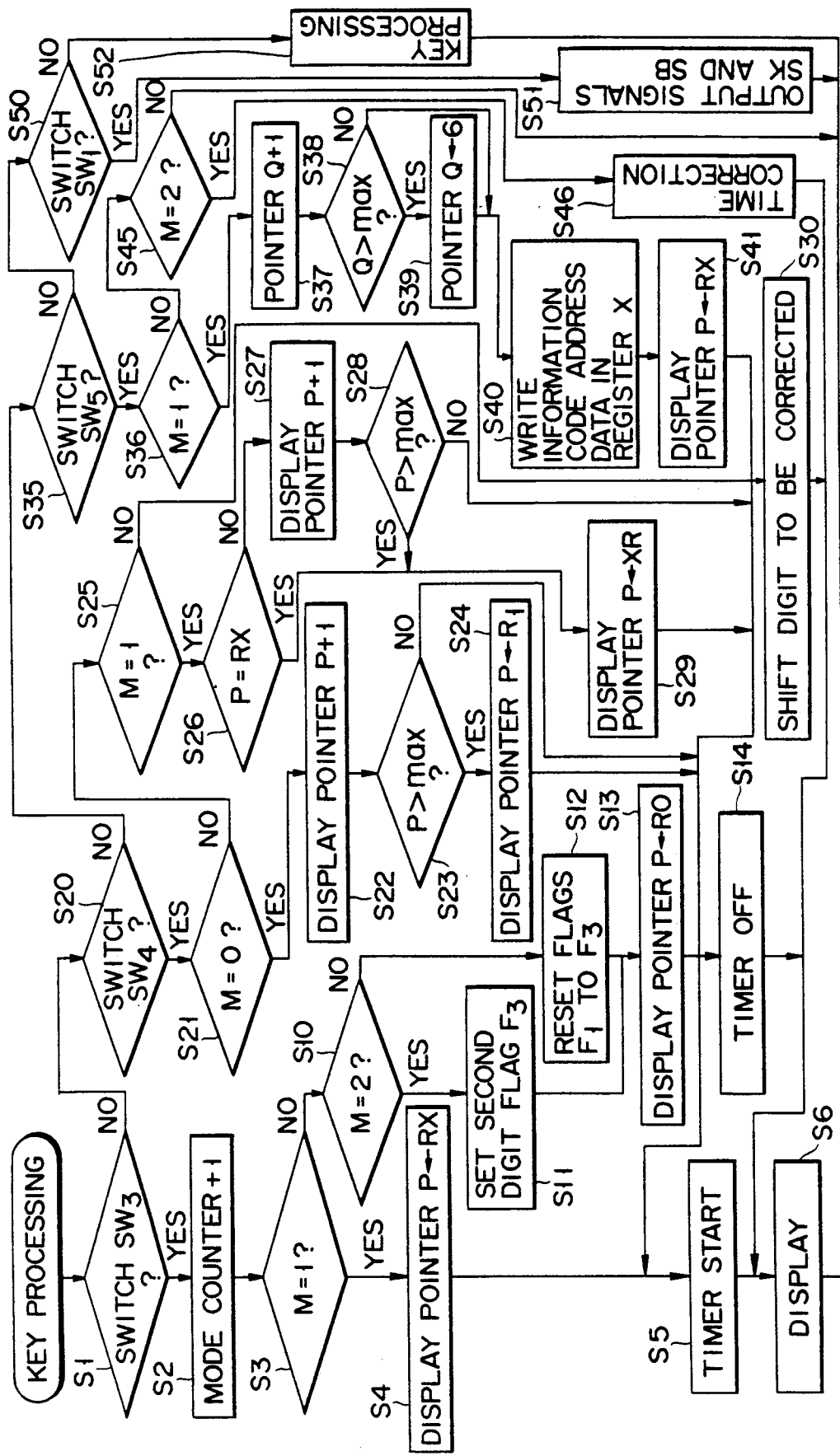
F I G. 14

| ROW ADDRESS | | |
|---|---|---|
| 1 | ADDRESS DATA | |
| 2 | ADDRESS DATA | |
| 3 | ADDRESS DATA | |
| 4 | ADDRESS DATA | |
| 5 | FRAME DATA | |
| 6 | REMAINING RECEPTION NUMBER DATA | |
| 7 | INFORMATION TYPE CODE | $R_{21}$ |
| 8 | INFORMATION TYPE CODE | $R_{31}$ |
| 9 | INFORMATION TYPE CODE | $R_{41}$ |
| 10 | INFORMATION TYPE CODE | $R_{51}$ |

Rows 1–4: ADDRESS DATA MEMORY AM
Row 5: FRAME DATA MEMORY FM
Row 6: REMAINING RECEPTION NUMBER MEMORY NM
Rows 7–10: INFORMATION TYPE MEMORY KM

F I G. 15

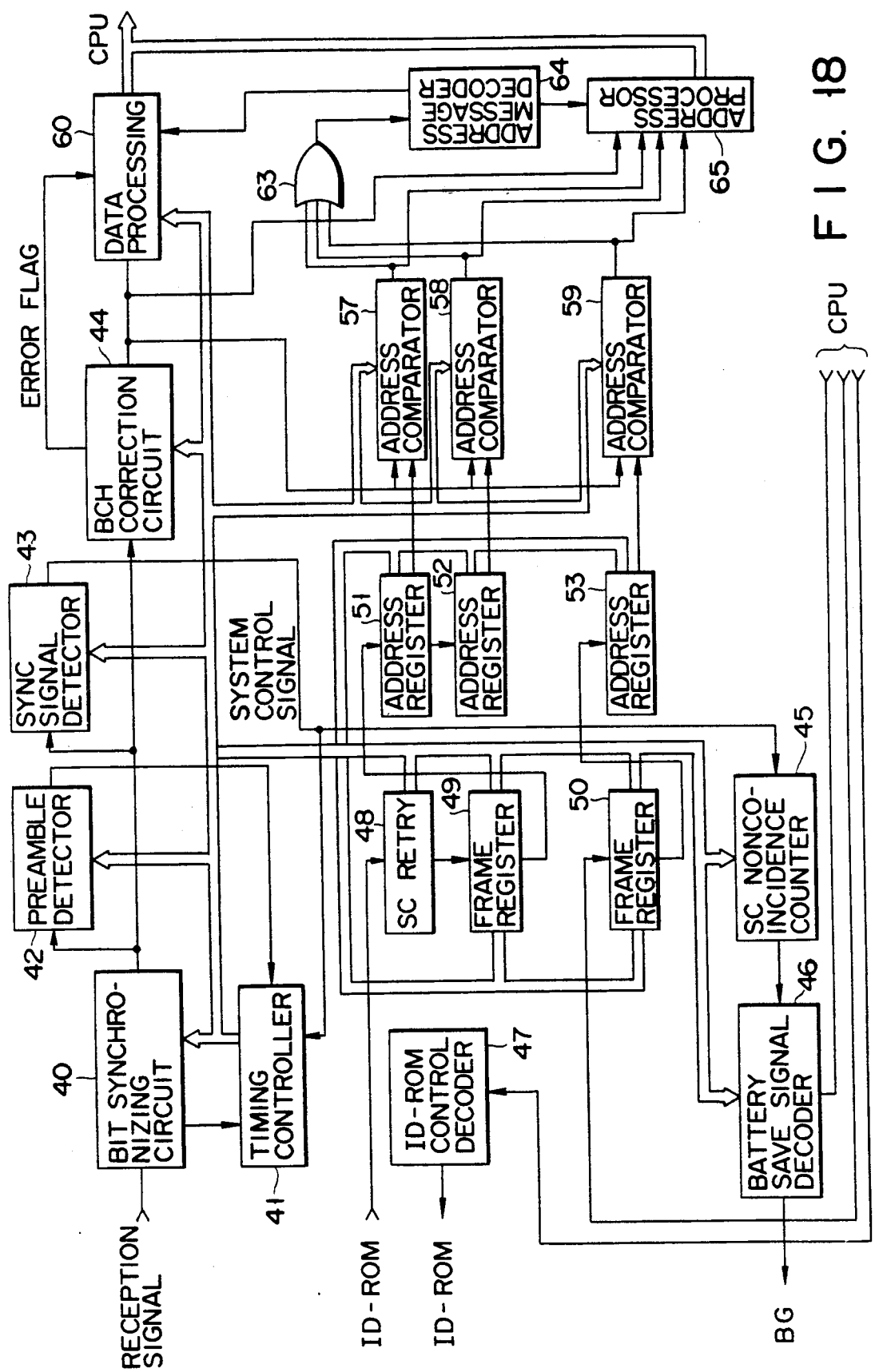
F I G. 18

PAGING RECEIVER WITH EXTERNAL MEMORY MEANS

BACKGROUND OF THE INVENTION

1. Field of the Invention

The present invention relates to improvements in a paging receiver and, more particularly, to a paging receiver suitable for receiving fee-charging information provided as message information by an information service company.

2. Description of the Related Art

Prior Art

In a paging system, a message can be transmitted to a paging receiver.

By utilizing such a paging system, a service for providing fee-charging information such as stock information or noble metal quotation information to a plurality of contractors is available.

In order to receive such information, in addition to specific reception control data (e.g., an individual address), reception control data (e.g., a common address) common to receivers who have contracts to receive the information must be set for each receiver. Conventionally, the reception control data is stored in a memory incorporated in a paging receiver. Since the reception control data is stored in the internal memory, however, the contents of the internal memory must be rewritten each time the contract contents of the service are changed or another type of service is additionally provided. Therefore, a change operation is very cumbersome.

Normally, a service of this type is based on a one-month contract, i.e., a charge is paid once a month. According to this payment system, however, a problem of nonpayment of the charge may occur for the information service company. In addition, since a use frequency does not always correspond to the charge, a user may feel the charge is comparatively high.

SUMMARY OF THE INVENTION

The present invention has been made in consideration of the above situation and has as its object to provide a paging receiver which can be used more conveniently.

In order to achieve the above object of the present invention, a paging receiver according to the present invention comprises a receiver main body comprising:
  receiving means (23) for receiving a paging signal;
  reception control means (46, 49, 50) for controlling the receiving means on the basis of reception control data;
  checking means (51-62) for checking whether the paging calling signal received by the receiving means is assigned to the receiver;
  fetching means (21, 66) for fetching a message next to the calling signal determined to be assigned to the receiver by the checking means; and
  memory means (28) for storing the reception message, and
external memory means (27), detachably mounted on the receiver main body, for storing at least a part of the reception control data, and supplying the reception control data stored therein to at least one of the reception control means and the checking means while it is mounted on the receiver main body.

In addition, in order to achieve the above object of the present invention, a paging signal receiving method according to the present invention, comprises the steps of:
  externally supplying reception control data to a paging receiver;
  receiving the paging signal in accordance with the externally supplied reception control data; and
  storing and displaying a message included in the received paging signal.

With the above arrangement, according to the paging receiver and the method of using the paging receiver of the present invention, by rewriting the storage contents of the memory means or by correcting the externally supplied data, a reception state and the like can be easily changed without repairing the paging receiver itself.

Therefore, when the paging receiver is used to receive various fee-charging information provided from an information service company, reception contents or the number of pieces of information to be received can be easily changed.

In addition, if a limit number of times of receiving the information from the information service company is included in the reception control data, a relationship between the number of reception times and a charge can be clearly shown, thereby reducing the number of charge troubles.

BRIEF DESCRIPTION OF THE DRAWINGS

FIG. 3A is a perspective view showing an outer appearance of a paging receiver according to the embodiment of the present invention;

FIG. 3B is a perspective view showing an outer appearance of a ROM card to be inserted in the paging receiver shown in FIG. 3A;

FIG. 12 is a flow chart for explaining an overall operation of the paging receiver according to the embodiment of the present invention;

FIG. 14 is a flow chart for explaining key processing of the paging receiver according to the embodiment of the present invention;

FIG. 15 is a memory map showing an internal arrangement of a ROM card according to a second embodiment of the present invention;

FIG. 18 is a block diagram showing an arrangement of a decoder unit of the paging receiver according to the third embodiment of the present invention;

DETAILED DESCRIPTION OF THE PREFERRED EMBODIMENTS

1st Embodiment

First embodiment of the present invention will be described in detail below with reference to the accompanying drawings.

Figure 1A:
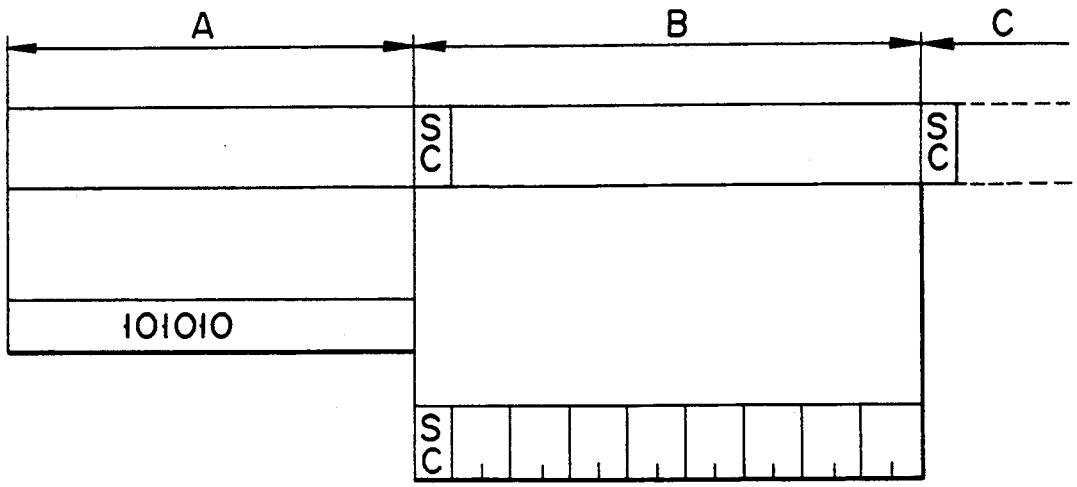
FIGS. 1A to 1D are views showing a transmission format for use in a selective paging communication system according to an embodiment of the present invention.
Figure 1B:
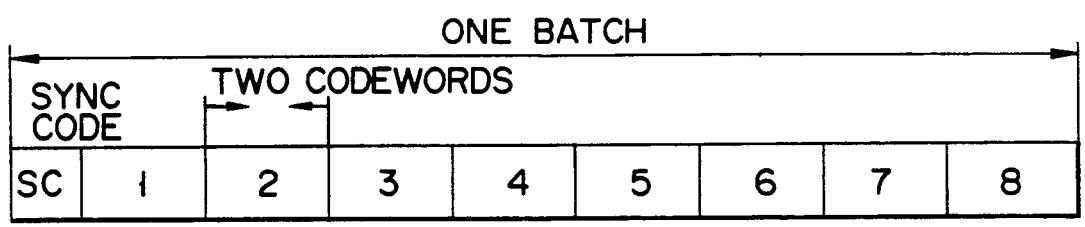
Figure 1C:
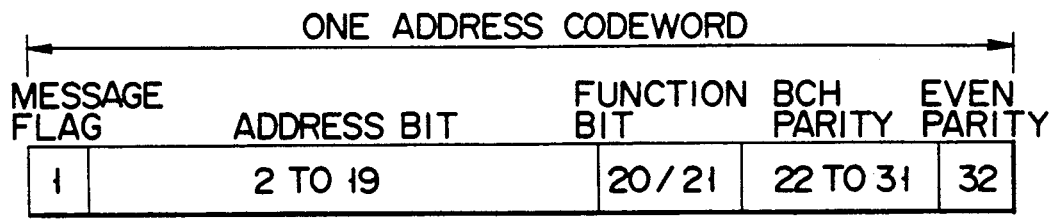
Figure 1D:
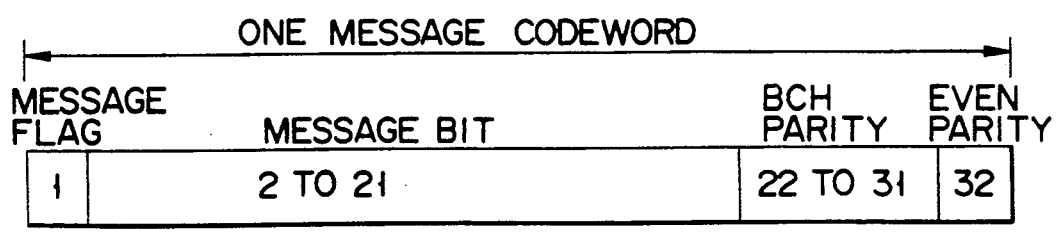

With reference to FIGS. 1A to 1D, a transmission signal format of a POCSAG (Post Office Code Standardization Advisory Group) code signal used in this embodiment will be described below. FIG. 1A shows an overall format of the POCSAG code signal. The transmission signal includes a preamble signal A and a plurality of subsequent batch signals B, C, ... The preamble signal A establishes bit synchronization between the transmission signal and the receiver and includes "1010101 ...", i.e., 576 successive bits of a repeating pattern of "1" and "0". FIG. 1B shows a format of each batch signal. Each batch signal includes a sync code SC and first to eighth frames. One frame includes two codewords. Each of the sync code SC and one codeword has 32 bits. The codewords are classified into an address codeword representing a calling number and a message codeword representing a message. FIGS. 1C and 1D show formats of the address and message codewords, respectively.

As shown in FIG. 1C, the address codeword includes a message flag ("0" indicating an address codeword is set) for indicating whether the codeword is an address or message codeword at the first bit; address bits at the second to 19th bits; function bits for indicating a display state or an alarm state at the 20th and 21st bits; BCH parity bits at the 22nd to 31st bits; and an even parity bit at the 32nd bit.

As shown in FIG. 1D, the message codeword includes a message flag ("1" indicating a message codeword is set) at the first bit; message bits at the second to 21st bits; BCH parity bits at the 22nd to 31st bits; and an even bit at the 32nd bit. The sync code SC has a specific 32-bit pattern.

In order to transmit a message, the address codeword is first transmitted, and then the message codeword of a required length is transmitted. Transmission is performed at a transmission speed of 62.5 ms per word (to be referred to as one-word time hereinafter). In order to avoid erroneous reception of the transmitted message, the same contents (an address and a message) are retransmitted after a predetermined time, for example 60 seconds.

Above mentioned POCSAG code signal is for calling selected paging receiver or receivers by the address data comprising the eighteen address bits of the address codeword, and the number of the frame where the address codeword is transmitted.

Therefore, each paging receiver assigned with one or two addresses and one of the eight frames for individual calling. Further, each of the paging receivers allowed to receive the contract information from the information service company, is assigned with an address and a frame for receiving the contract information as well as the addresses and the frame for individual calling.

Figure 2:
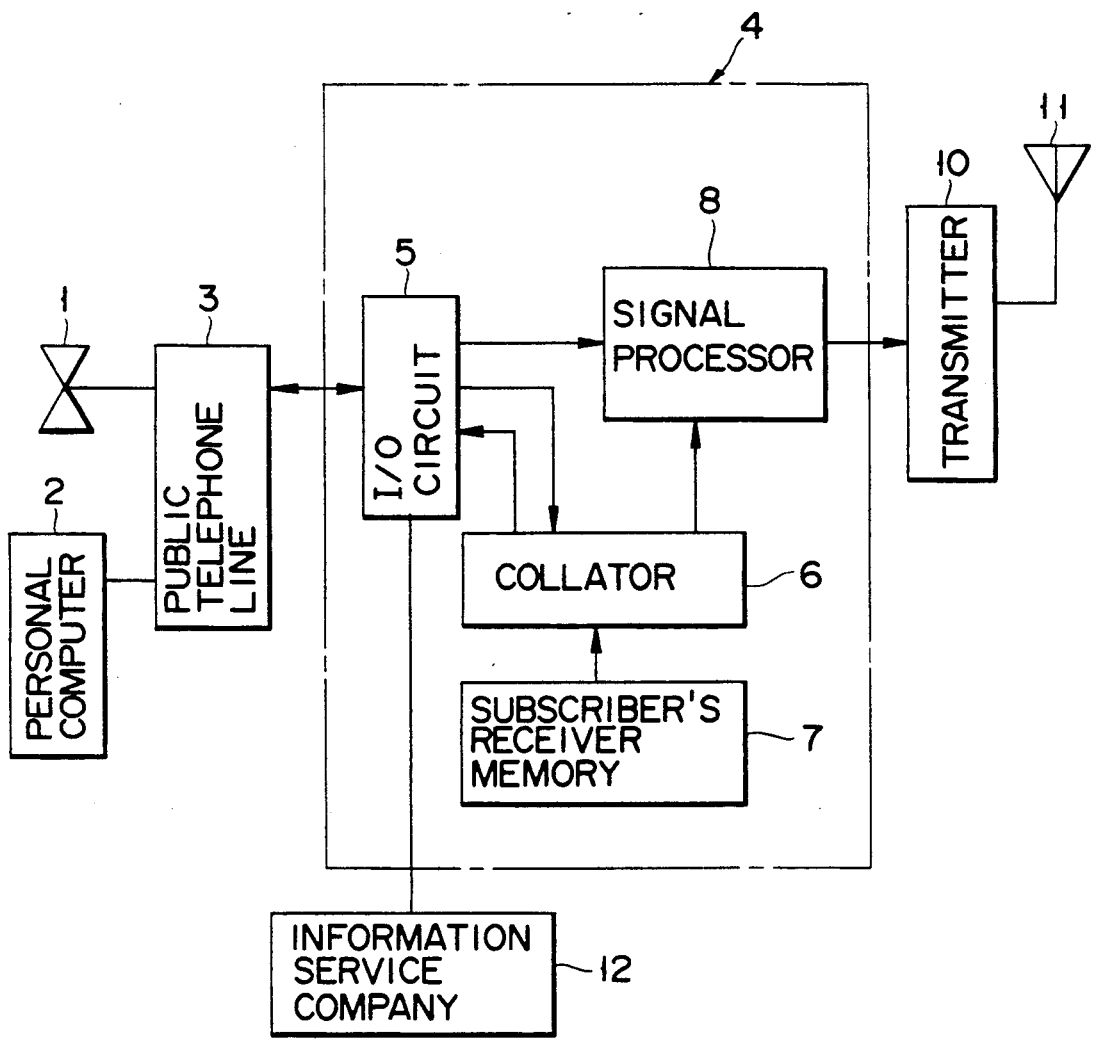
FIG. 2 is a block diagram showing an arrangement of a base station according to the embodiment of the present invention.

FIG. 2 is a block diagram showing a system configuration of a base station in a radio paging communication system. An arrangement of this base station will be described below. Referring to FIG. 2, a key telephone set 1 and a personal computer 2 with a communication function are input terminals for causing a caller to input a calling number of a paging receiver and a message thereto. The key telephone set 1 and the personal computer 2 are connected to a control center 4 through a public telephone line 3. The control center 4 includes an I/O circuit 5 connected to the public telephone line 3. The I/O circuit 5 includes a modem and an answering circuit. A calling number input by the caller at the key telephone set 1 or the personal computer 2 is input to a collator 6 through the public telephone line 3 and the I/O circuit 5. The collator 6 collates the input calling number with calling numbers of a plurality of subscriber's receivers stored in a subscriber's receiver memory 7. The subscriber's receiver memory 7 stores calling numbers including calling numbers which are assigned to the information service company o the type of the information from the company as well as calling numbers for the individual calling. In this collating processing, when the input calling number does not coincide with any one of the calling numbers stored in the memory 7, the collator 6 sends a command to the answering circuit in the I/O circuit 5 to cause the answering circuit to send to the caller a message "The designated calling number is not registered at present". When the input calling number coincides with one of the calling numbers stored in the memory 7, the collator 6 sends the input calling number which coincides with one of the stored calling numbers to a signal processor 8. At the same time, the collator 6 outputs one of the different commands based on different types of paging receivers in accordance with the destination paging receiver assigned with this calling number. The selected command is output to the I/O circuit 5 and the signal processor 8. When the type of paging receiver assigned with the input calling number coinciding with the stored calling number is a tone-only type having no display device, the collator 6 sends a command to cause the I/O circuit 5 to send a message "Calling is started. Please hang up the phone and wait" to the caller. The collator 6 sends a command to cause the signal processor 8 to send a paging signal.

When the type of paging receiver is a numeric display type, the collator 6 sends a command to the I/O circuit 5 to cause it to send a message "Please input a message" to the caller. In this case, the collator 6 sends a command to the signal processor 8 to cause it to treat the message data input from the caller as numeric code data. When the type of paging receiver is an alphanumeric display type, the collator 6 sends a command to the I/O circuit 5 to cause it to send a message "Please input a message" to the caller. In this case, the collator 6 sends a command to the signal processor 8 to cause it to treat the message data input from the caller as alphanumeric code data.

The signal processor 8 develops the calling number from the collator 6 to address data and frame data, and generates corresponding address codeword. The signal processor 8 generates a message codeword corresponding to the caller's message data on the basis of the commands from the collator 6, and sends the address codeword and the message codeword as a paging signal code to a transmitter 10. In this case, the address codeword is inserted in any one of the frames of the batch format shown in FIG. 1B on the basis of the frame data. The message codeword is transmitted next to the address codeword. If the message data from the caller cannot be assigned to one message codeword, a plurality of message codewords are generated and are continuously transmitted next to the address codeword. The transmitter 10 transmits the paging signal code from the signal processor 8 as a radio signal from an antenna 11.

In this embodiment, a transmission circuit of an information service company is connected to the I/O circuit 5 through an exclusive line or public line. The information service company inputs a calling number for receiving the fee-charged information and the information to be transmitted. The calling number and the information, both transmitted to the base station, are processed in the same way as in the case of individual calling, and are then transmitted from the base station to the subscribers' receivers.

An arrangement of the receiver will be described below.

FIG. 3A shows a main body 15 of the receiver according to this embodiment. The main body 15 has a main switch $SW_1$, a display 14, a mode switch $SW_3$, a readout switch $SW_4$, and a page switch $SW_5$ on its upper surface. The main body 15 also has a mounting portion 16 on its side surface. A ROM card 27, which stores control data for receiving information from the information service company, is detachably connected to the mounting portion. A switch (not shown), for selecting whether a buzzer is driven or not when the receiver is called, is also provided to the receiver.

FIG. 3B shows an outer appearance of a ROM card 27.

In order to receive the information service, the ROM card 27 is inserted from its terminal portions 27a into the mounting portion 16 formed in the side surface of the main body 15. In the main body 15, the terminal portions 27a are connected to an I/O port of a CPU 21 (to be described later). The ROM card 27 is constituted by, e.g., a mask ROM, an EEPROM or a RAM including a backup power source.

The display 14 includes a first subdisplay portion 14A, a second subdisplay portion 14B, a first main display portion 14C, and a second display portion 14D. The first subdisplay portion 14A displays whether a buzzer is driven when the receiver is called, a battery service life, and the like. When the receiver is called, the second subdisplay portion 14B displays the type of calling, the type of received information, and the like. The first and second main display portions 14C and 14D display the received message. At the right end of the first main display portion 14C, a reception time of the message is displayed while the message is displayed, and a current time is displayed in other cases.

The main switch $SW_1$ is used to switch on/off a power source of the receiver. The mode switch $SW_3$ is used to switch a mode. The mode of the receiver is switched each time the switch $SW_3$ is operated. The readout switch $SW_4$ is used to switch a display message. Each time the switch $SW_4$ is operated, the display 14 selectively displays past messages received and stored in an internal memory The switch $SW_5$ is used to switch type of displayed information from the information service company.

An internal arrangement of the receiver shown in FIGS. 3A and 3B will be described below with reference to FIG. 4.

Figure 4:
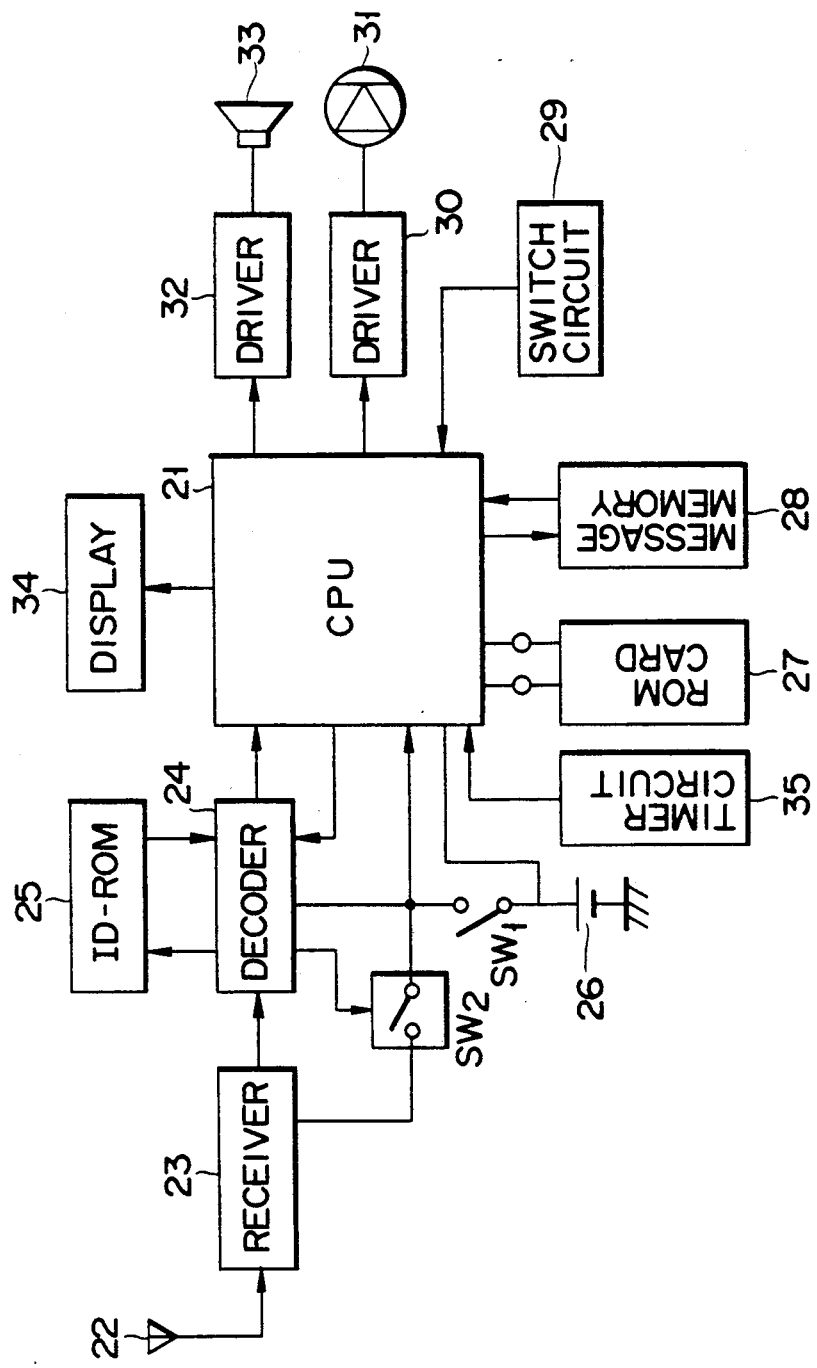
FIG. 4 is a block diagram showing an arrangement of the paging receiver according to the embodiment of the present invention.

As shown in FIG. 4, the paging receiver of this embodiment includes a CPU 21.

The CPU 21 controls each circuit in accordance with programs stored in an internal ROM. Referring to FIG. 4, a radio wave received by an antenna 22 is supplied to a receiver 23 for demodulating the radio wave. The ID-ROM 25 stores a frame number, an address, and the like assigned to the receiver. The ROM card 27 is detachably mounted in the main body 15. The ROM card 27 is mounted in the main body 15 in order to receive the information service. The ROM card 27 stores reception control data (e.g., a frame number and an address) for receiving the information service. The ID-ROM 25 sends the stored frame number and the like to a decoder 24 under the control of the decoder 24. The ROM card 27 sends the stored frame number, address data and the like to the decoder 24 under the control of the CPU 21. The decoder 24 decodes the reception signal demodulated by the receiver 23 and sends the decoded data to the CPU 21 when the reception signal is assigned to the receiver. The decoder 24 ON/OFF-controls a switch $Sw_2$. When the switch $SW_2$ is turned on, it supplies power supplied from a power source 26 via a switch $SW_1$ to the receiver 23. The switch $SW_1$ is turned on/off by an operation of a user. When the switch $SW_1$ is turned on, it supplies the power supplied from the power source 26 to the decoder 24, and the switch $SW_2$. A message memory 28 stores a received message. A switch circuit 29 includes a plurality of switches (switches $SW_3$ to $SW_5$ in FIG. 3A) and sends a switch input signal corresponding to an operated switch to the CPU 21. An LED driver 30 flashes an LED 31 under the control of the CPU 21, thereby indicating that the receiver is called. A buzzer driver 32 drives a buzzer 33 under the control of the CPU 21, thereby indicating that the receiver is called and the like. A display 34 displays the received message stored in the message memory 28 and the like under the control of the CPU 21.

A timer circuit 35 outputs a predetermined time elapse pulse to the CPU 21 each time a predetermined period, e.g., a 1/16 second elapses.

Figure 5:
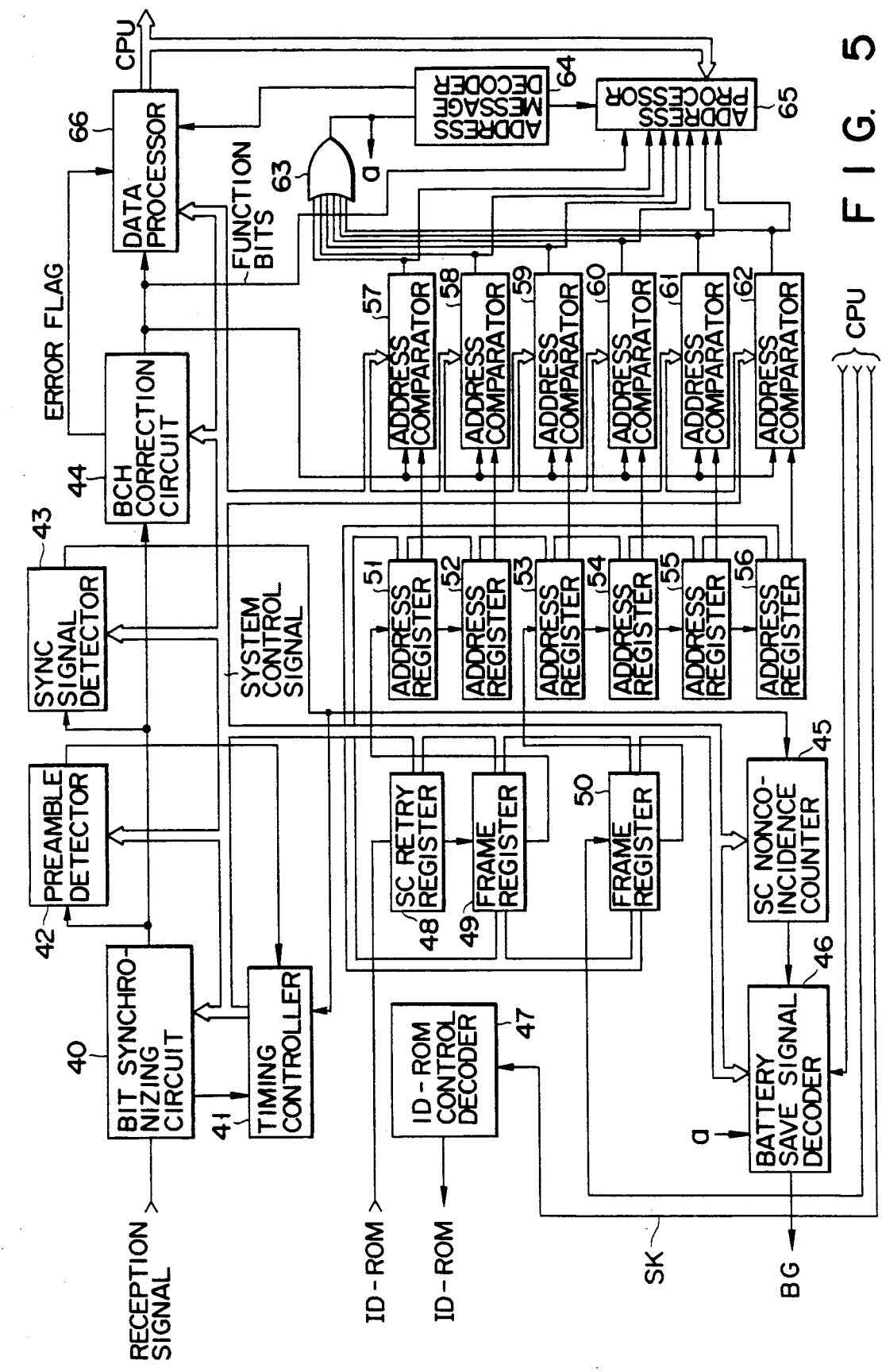
FIG. 5 is a block diagram showing an arrangement of a decoder unit shown in FIG. 4.

FIG. 5 shows an arrangement of the decoder 24 in detail. A bit synchronizing circuit 40 receives a reception signal including a bit string of "1" and "0" demodulated by the receiver 23. The bit synchronizing circuit 40, having a bit synchronizing counter, synchronizes the input bit string with an internal clock supplied from a timing controller 41 to be described below. The bit synchronizing circuit 40 sends the reception signal as the synchronized bit string to a preamble detector 42, a sync signal detector 43, and a BCH correcting circuit 44. The timing controller 41 has an oscillator, a 32-scale bit counter, a 17-scale word counter, and the like. The timing controller 41 generates clock signals having the same frequency as the reception signal and higher frequency. The timing controller 41 also performs timing control of the overall decoder 24 in response to detection signals from the preamble detector 42 and the sync signal detector 43, thereby determining a signal read timing and an operation order of the respective circuits. The preamble detector 42 detects the preamble signal A in the reception signal, i.e., the bit string from the bit synchronizing circuit 40. When the preamble detector 42 detects eight successive bits of repeating data of "0" and "1" (i.e., 01010101 or 10101010), it determines that the preamble signal A is detected and sends a detection signal to the timing controller 41.

The sync signal detector 43 detects a sync code SC in the reception signal and sends a detection signal to the timing controller 41 and an SC noncoincidence counter 45 to be described below. As shown in FIGS. 1C and 1D, the BCH correcting circuit 44 performs BCH error correcting processing for the reception signal including a BCH parity code. The BCH correcting circuit 44 sends corrected data to a data processor 66 and address comparators 57 to 62. If an uncorrectable error occurs, the BCH correcting circuit 44 sends a signal for an error flag to the data processor 66. The SC noncoincidence counter 45 has a counter which is incremented by one by a carry output from the word counter in the timing controller 41 and reset by the detection signal from the sync signal detector 43. This counter counts the number of non-ditition of the sync signal, in series, which should be detected in a predetermined frequency. When the count value of the counter reaches an allowable number of step-out set in an SC retry register 48, the counter sends a signal to a battery save signal decoder 46 to execute a preamble detecting operation again. The battery save signal decoder 46 receives the signal from the timing controller 41, frame registers 49, 50, the SC noncoincidence counter 45, and the CPU 21, and ON-/OFF-controls the switch SW$_2$.

An ID-ROM control decoder 47 receives a signal SK supplied from the CPU 21 when the switch SW$_1$ is turned on and supplies a signal to and controls the ID-ROM 25. The SC retry register 48, frame register 49, and address registers 51 and 52 set data sequentially supplied from the ID-ROM 25 under the control of the ID-ROM control decoder 47. An allowable number of step-out is set in the SC retry register 48. A frame number (e.g. 2; second frame) assigned to the paging receiver and used upon individual calling is set in the frame register 49. An address which should be compared with addresses received in a frame of the number set in the frame register 49 i.e., individual calling address is set in each of the address registers 51 and 52. First individual calling address used when only the corresponding one receiver is to be individually called is set in the address register 51. Second individual calling address used when emergency calling is performed and/or receivers belonging to a group consisting of a plurality of receivers (these receivers are assigned with the same frame) are to be simultaneously called is set in the address register 52. The address registers 51 and 52 are controlled by the frame register 49 under the control of the timing controller 4 and sends the set addresses to the address comparators 57 and 58, respectively. The frame register 50 stores the number (e.g. 8; eighth frame) of a frame to which information is transmitted from the information service company. Addresses for receiving contract information, i.e., address which should be compared with an address received in a frame of the number set in the frame register 50 are set in the address registers 53 to 56. That is, addresses for receiving pieces of contract information such as gold quotation information, stock price information of a company A, a weather report of a specific area, and horse racing information are set in the address registers 53, 54, 55, and 56, respectively. The address registers 53 to 56 are controlled by the frame register 50 under the control of the timing controller 41. The address registers 53 to 56 send the set addresses to the address comparators 59 to 62, respectively. The address comparators 57 to 62 are controlled by the timing controller 41. The address comparators 57 to 62 compare the reception address supplied from the BCH correcting circuit 44 with the addresses supplied from the address registers 51 to 56. When the reception address coincides with any one of the addresses, a corresponding one of the address comparators 57 to 62 sends a coincidence detection signal to an OR gate 63 and an address processor 65. An output signal of the OR gate 63 is supplied to the battery save signal decoder 46, to cause the decoder 46 to receive paging signals continuously, and is supplied also to the address message decoder 64. An address message decoder 64 receives the signal supplied via the OR gate 63 and supplies an operation command signal to the address processor 65. After a predetermined time elapses, the address message decoder 64 supplies an operation command signal to the data processor 66. The address processor 65 receives the operation command signal from the address message decoder 64 and starts an operation. The address processor 65 outputs an 8-bit parallel signal including six output bits from the address comparators 57 to 62 and two function bits included in the reception address codeword. The data processor 66 receives the operation command signal from the address message decoder 64 and starts an operation. The data processor 66 is an S-P converter for converting the message given a serial data from the BCH correcting circuit 44 under the control of the timing controller 41 into parallel data used in the CPU 21 and sending the converted data.

Figure 6:
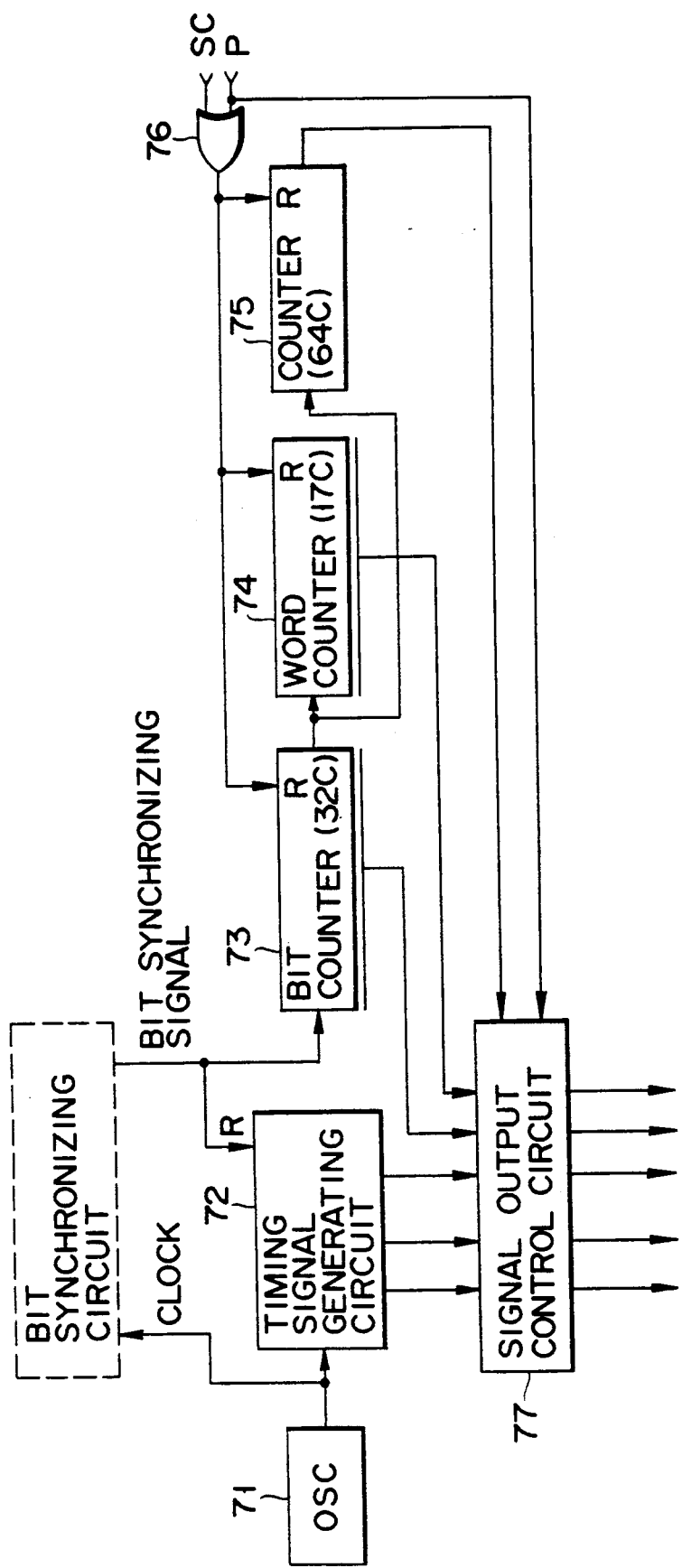
FIG. 6 is a block diagram showing an arrangement of a timing controller shown in FIG. 5.

An arrangement of the timing controller 4 will be described in detail below with reference to FIG. 6. An oscillator 71 supplies a clock signal to the bit synchronizing circuit 40 and a timing signal generating circuit 72. The clock signal has a frequency sixteen times of a clock frequency of the transmission data. The timing signal generating circuit 72 is reset by a bit synchronizing signal from the bit synchronizing circuit 40. The timing signal generating circuit 72 generates various kins of control signals synchronizing with the received signal. The bit synchronizing signal is supplied to a 32-scale bit counter 73 as a count-up signal. A carry signal of the bit counter 73 is supplied to 17-scale word counter 74 and a 64-scale counter 75. The preamble detection signal P, and a synchronizing signal detection signal SC are supplied to reset terminals of the counter 73, 74, 75 through an OR gate 76. A signal generation control circuit 77 generates control signals and count value data based on the timing signal from timing signal generating circuit 72, the output data from bit counter 78 and word counter 79, the carry signal from the counter 75, and the preamble detection signal P. The signal generation control circuit 77 supplies generated control signals and count value data to the respective circuits shown in FIG. 5.

Figures 7, 8:
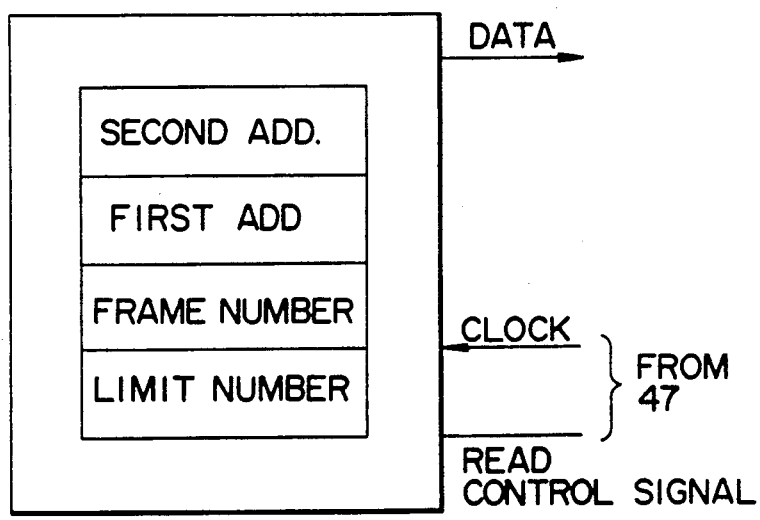
FIG. 7 is a memory map showing an internal arrangement of an ID-ROM shown in FIG. 4.
FIG. 8 is a memory map showing an internal arrangement of the ROM card.

A format of the ID-ROM 25 will now be described below with reference to FIG. 7. As shown in FIG. 7, the ID-ROM 25 has a 4-row memory area. In memory area of first row, the second address for individual calling which is to be set at the address register 52, i.e., an address for calling a plurality of paging receivers including this paging receiver are set. In memory area of second row, the first address for individual calling which is to be set at the address register 51, i.e., an address for calling corresponding one paging receiver are set. In memory areas of third row, a frame number for individual calling, in this embodiment, 2 are set. In a memory area of fourth rows, the number of tries allowed set in the SC retry register 48, in this embodiment, 2 are set.

FIG. 8 is a memory map showing a format of the ROM card 27. A storage area of the ROM card 27 has a plurality of rows. Storage areas of the first to fourth rows constitute an address data memory AM. Each row of the address data memory AM fixedly stores an address set in a corresponding one of the address registers 53 to 56, i.e., an address for receiving the information service is stored. For example, the memory area of the first row stores an address commonly assigned to receivers who have contracts to receive gold quotation information is stored.

A memory area of the fifth row constitutes a frame data memory FM. The frame data memory FM fixedly stores a frame number set in the frame data register 50, i.e., the number of a frame used to receive the information service, in this embodiment 8. Memory areas after the sixth row constitute an information type memory KM. The information type memory KM stores a plurality of groups each of which includes area number (row address) of the address data memory AM storing the address data, code data representing the type of information received by the address, and start address of memory area of the message memory 28 storing such kind of received information. That is, the information type memory KM stores data representing the type of information received in each address stored in the address data memory AM and data representing area of the message memory 28 where the received data is stored. Note that one information type does not always correspond to one address. For example, gold quotation information from London, gold quotation information from New York, and gold quotation information from Tokyo may correspond to an address for receiving gold quotation information.

Figure 9:
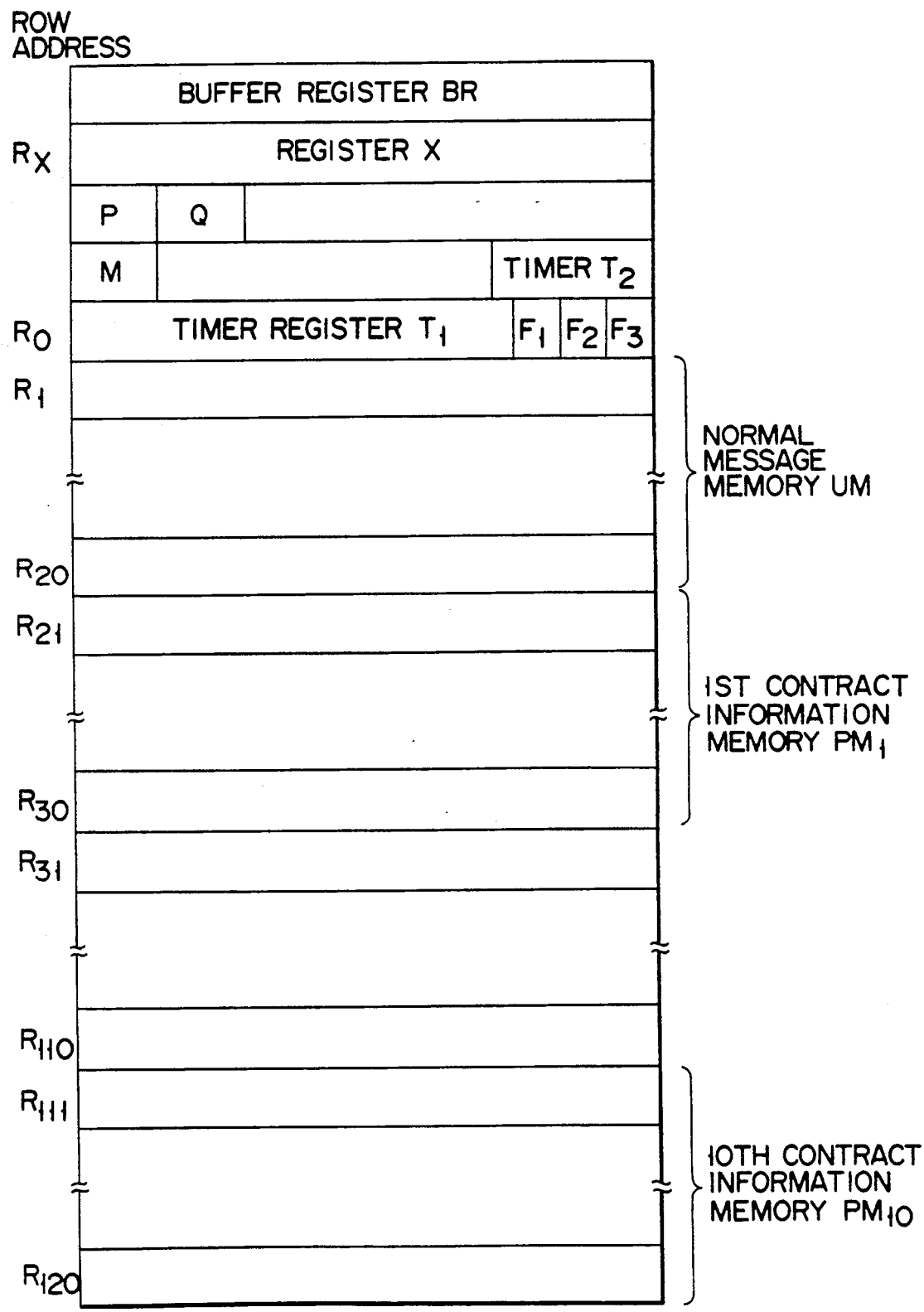
FIG. 9 is a memory map showing an internal arrangement of a message memory shown in FIG. 4.

A format of the message memory 28 will be described below with reference to FIG. 9. Referring to FIG. 9, a buffer register BR temporarily stores the received data supplied from the decoder 24 to the CPU 21. A row register X at a row address Rx stores start addresses of memory areas (PM1 to PM10) in which the type of contract information selected for display and the contract information are stored. A row address of an arbitrary row of the message memory 27 is set in a display pointer P. The display 14 displays a row designated by the contents of the display pointer P or displays the contents of a register or the like in the designated row. A pointer Q store the row address of the information type memory KM. A mode counter M is a ternary counter. When the value of the counter M is 0, it designates a normal mode; when its value is 1, it designates a contract information display mode; when its value is 2, it designates a time correction mode. In the normal mode, the display 14 displays a current time and a normal reception message (a message except for an information message which can be received by the contract, e.g., a message sent upon individual calling). In the contract information display mode, an information message and the like received on the basis of the contract is displayed on the display 14. In the time correction mode, a time of a timer register T1 (to be described later) is corrected. The pointer Q is used for selecting row address to be described later. By selecting the row address, one of first contract information (the gold quotation information), second contract information (the stock quotation information), third contract information (the forecast information), and fourth contract information (the horse race information) can be selected. A timer T2 is used to measure a predetermined time so that the buzzer 33 generates a sound and/or the LED 31 is flashed for the predetermined time. A current time is set in the timer register T1. Flags F1 to F3 designate digits to be corrected in the above time correction mode.

Memory areas of row addresses R1 to R20 constitute a normal message memory UM. The normal message memory UM stores the above normal reception message (including the type of calling and an incoming time). The row addresses R21 to R120, first to tenth contract information memories PM1 to PM10 are constituted in units of ten rows. The first contract information memory PM1 stores received gold quotation information of Tokyo in an order of reception, the second contract information memory PM2 stores received gold quotation information of London in an order of reception, the third contract information memory PM3 stores received stock quotation information of Tokyo in an order of reception, and the fourth contract information memory PM4 stores received weather forcast information in an order of reception.

An operation of the paging receiver having the above arrangement will be described with reference to FIGS. 5, 10A to 10C, and 11A and 11B.

Figures 10A, 10B, 10C, 11A, 11B:
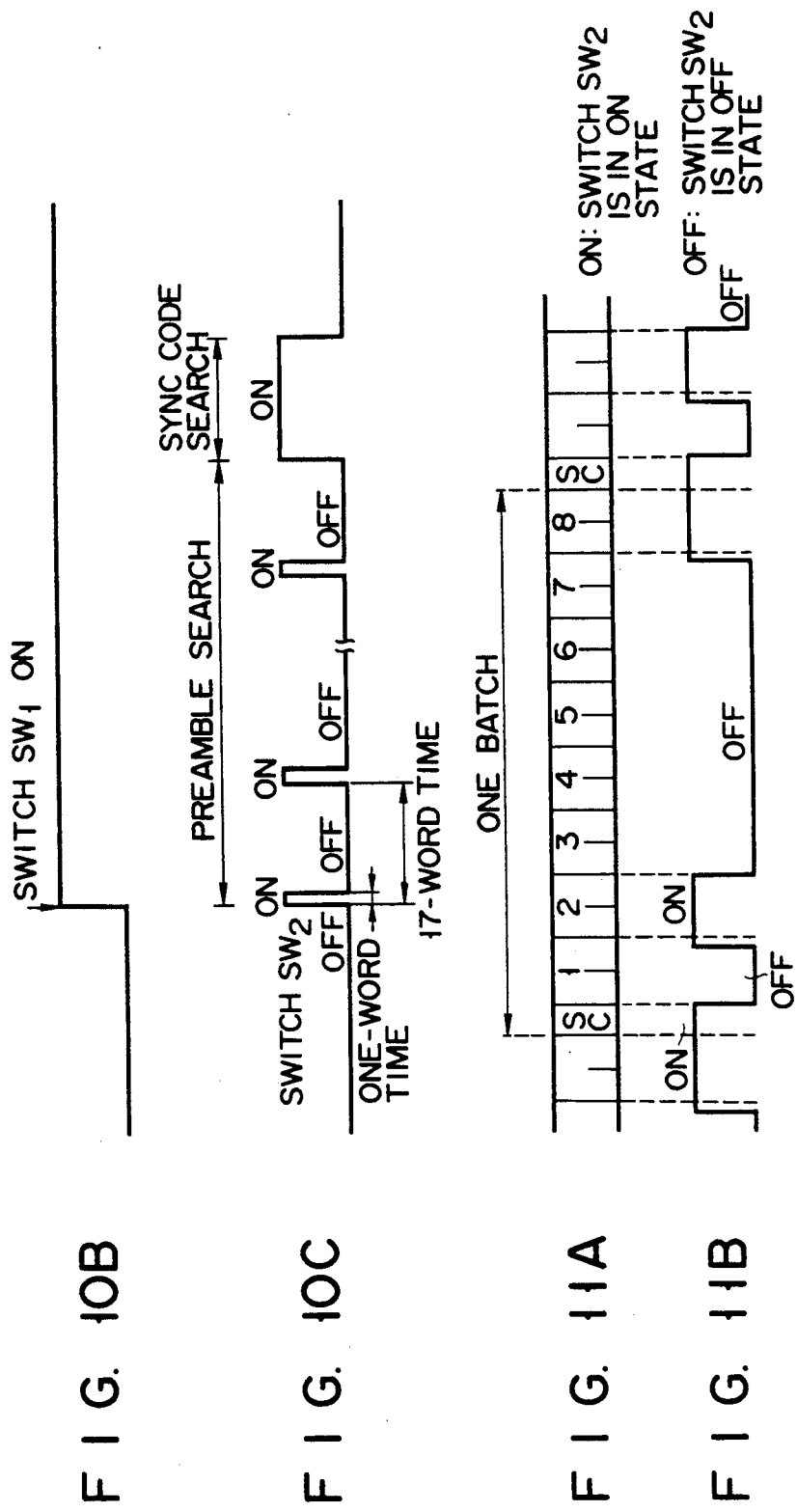
FIGS. 10A to 10C are timing charts for explaining a preamble search operation and a sync code search operation of the paging receiver.
FIGS. 11A and 11B are timing charts showing a reception state of the paging receiver.

When a user turns on the switch $SW_1$ shown in FIGS. 3A and 4 (FIG. 10B), the CPU 21 detects this and outputs a start signal SK to the ID-ROM control decoder 47 of the decoder 24. In response to the signal, the ID-ROM control decoder 47 supplies a control signal to the ID-ROM 25. In response to the control signal, the ID-ROM 25 outputs its storage data. Address data assigned to the receiver, frame data assigned to the receiver, and SC retry data are set in the address registers 51 and 52 included in the decoder 24 the frame register 49, and the SC retry register 48. When the ROM card 27 is mounted, the CPU 21 reads storage data of the address data memory AM and the frame data memory FM and sets the readout data in the frame register 50 and the address registers 53 to 56. As a result, the SC retry data is set in the SC retry register 48; the number "2" of a frame used to perform individual calling of the corresponding paging receiver or group calling is set in the frame register 49; an address used to call only the corresponding paging receiver by using the frame of the number stored in the frame register 49 is set in the address register 51; an address used to perform group calling by the frame of the number stored in the frame register 49 is set in the address register 52; the frame number "8" of a frame used to receive the information service is set in the frame register 50; and addresses for receiving calling by the frame stored in the frame register 50 are set in the address registers 53 to 56. After the CPU 21 outputs the start signal SK to the ID-ROM control decoder 47, it sends a control signal SB to the battery save signal decoder 46. In response to the control signal SB, the battery save signal decoder 46 starts a preamble search operation. More specifically, the decoder 46 sets the switch $SW_2$ in an ON state only while a one-word time (time required for transmitting one-word data) at a period of 17-word time as shown in FIG. 10C. As shown in FIG. 10A, a preamble signal A is continuously supplied for an 18-word time at a time. Therefore, while the preamble signal A is supplied twice, the switch $SW_2$ is inevitably turned on for a time interval in which the preamble signal A is transmitted. When the switch $SW_2$ is turned on, power is supplied from the power source 26 to the receiver 23 via the switches $SW_1$ and $SW_2$ (FIG. 4). When the switch $SW_2$ is in ON state, the preamble signal A is supplied as a bit string to the bit synchronizing circuit 40 of the decoder 24 via the antenna 22 and the receiver 23. The preamble signal A is synchronized with a circuit operation timing by the bit synchronizing circuit 40 and supplied to the preamble detector 42. The preamble detector 42 detects that the supplied signal is the preamble signal A, i.e., the supplied signal is a repeating pattern of "0" and "1", and supplies a detection signal to the timing controller 41. The counters 73, 74 and 75 are reset by the detection signal and restart counting from 0. In response to the detection signal, the timing controller 41 supplies a control signal to the battery save signal decoder 46 and continuously sets the switch $SW_2$ in the ON state (FIG. 10C). The sync signal detector 43 sequentially receives the bit string from the bit synchronizing circuit 40. Each time a new bit is supplied, the detector 43 combines the new bit with 31 immediately preceding bits to generate data of 32 bits (this is the number of bits of one word, i.e., a sync code SC), and checks whether the data coincides with a predetermined sync code pattern. When the detector 43 detects the sync code SC in the reception data, it outputs a detection signal and resets the bit counter 73, the word counter 74 and counter 75 in the timing controller 41. The timing controller 41 supplies a control signal to the battery save signal decoder 46. In response to the control signal, the decoder 46 repeatedly turns on the switch SW2 at a timing at which the sync code SC is supplied and at timings at which the frames 2 and 8 are transmitted, as shown in FIGS. 11A and 11B. As a result, the power is supplied to the receiver 3 only at the timings at which the sync code SC and the frames 2 and 8 are transmitted (the power is actually supplied at a timing about an 8-bit time before these timings), thereby performing a reception operation. That is, in order to save power, the decoder 24 turns on the receiver 23 only when there is a possibility that the paging receiver is called and performs the reception operation. Note that if the sync code SC is not detected within a 64-word time after the above sync code search operation is started, the preamble search operation is performed again.

At the timing of reception of the second frame, the receiver 23 is turned on to receive an address codeword. The received address codeword is supplied from the bit synchronizing circuit 40 to the BCH correcting circuit 44. The BCH correcting circuit 44 performs BCH error correction processing for the reception data and supplies corrected reception data to the address comparators 57 to 62. At the frame 2 reception timing, the timing controller 41 supplies a control signal to the frame register 49 regardless of the presence/absence of reception of the above address. In response to the control signal, the frame register 49 supplies a control signal to the address registers 51 and 52. In response to this control signal, address data set in the address registers 51 and 52 are supplied as bit strings to the address comparators 57 and 58.

The address comparators 57 and 58 check whether the paging receiver is called. More specifically, when an address is supplied from the BCH correcting circuit 44, the address comparator 57 compares the supplied address with the address supplied from the address register 51 and checks whether the two addresses coincide with each other. When an address is supplied from the BCH correcting circuit 44, the address comparator 58 compares the supplied address with the address supplied from the address register 52 and checks whether the two addresses coincide with each other. Each of the address comparators 59 to 62 outputs a signal of level "0". When either the address comparator 57 or 58 detects a coincidence of the addresses, this address comparator supplies a detection signal to the OR gate 63 and the address processor 65. The address message decoder 64 receives the detection signal supplied via the OR gate 63 and sends an operation command signal to the address processor 65. In response to the operation command signal, the address processor 65 converts the output signals from the address comparators 57 to 62 and function bit data included in the received address codeword into a parallel bit signal used in the CPU 21 and sends the parallel bit signal to the CPU 21. The CPU 21 stores the parallel bit signal in the buffer register BR of the message memory 28.

After the above operation, the address message decoder 64 sends an operation command signal to the data processor 66. In response to this operation command signal, the data processor 66 sequentially fetches a bit string of a message part of the message codeword supplied next to the address codeword from the BCH correcting circuit 44, converts the bit string into a parallel bit signal, and sends the converted signal to the CPU 21.

The CPU 21 also stores the supplied message with the parallel bit signal in the buffer register B of the message memory 28. CPU 21 determines that the data is message data, and checks erroneous reception or the like. After that, CPU 21 stores the message into respective memory area of the message memory 28, and causes the display 14 to display the message.

The CPU 21 which received this data sends an operation command signal to the buzzer driver 32 based on the data, from the address processor 65, stored in the buffer register BR. The buzzer driver 31 drives the buzzer 33 to generate a sound. The CPU 21 also sends the operation command signal to the LED driver 3 to flash the LED 31. Therefore, a user can easily recognize that a calling is made.

When an address is received at the timing of the frame number 8, the received address is supplied from the bit synchronizing circuit 40 to the BCH correcting circuit 44. The BCH correcting circuit 44 performs the BCH error correction processing for the reception data. The corrected reception data is supplied to the address comparators 57 to 62. At the above timing, a control signal is supplied from the timing controller 41 to the frame register 50 regardless of the presence/absence of reception of the address. In response to this control signal, the frame register 50 supplies a control signal to the address registers 53 to 56, and the addresses set in these registers are supplied to the address comparators 59 to 62.

When the addresses are supplied via the BCH correcting circuit 44, the address comparators 59 to 62 compare the supplied addresses with the addresses assigned to the paging receivers and supplied from the address registers 53 to 56, respectively. Each of the address comparators 57 and 58 outputs a signal of level "0". When any of the address comparators 59 to 62 detects a coincidence of the addresses (i.e., when a calling is made for the paging receiver), this address comparator sends a detection signal to the address message decoder 64 via the OR gate 43. In response to the detection signal, the address message decoder 64 supplies an operation command signal to the address processor 65. The address processor 65 converts output signals from the address comparators 57 to 6 and function bit data included in the received address codeword into a parallel bit signal and sends the converted parallel bit signal to the CPU 21. The CPU 21 stores the parallel bit signal into the buffer register BR After the above operation, the address message decoder 64 sends an operation command signal to the data processor 66. In response to this operation command signal, the data processor 66 sequentially fetches a bit string of a message part of the message codeword supplied next to the address code from the BCH correcting circuit 44. The processor 66 converts the fetched message into a parallel bit signal used in the CPU 21 and sends the converted signal to the CPU 21.

The CPU 21 also stores the supplied message into the buffer register BR. The CPU 21 executes predetermined checks for the supplied message and displays the message on the display 14.

In accordance with the contents of the parallel bit signal from the address comparator 65, the CPU 21 selects a corresponding contract information storage area in the message memory 28 and stores the data stored in the buffer register BR into the selected memory area. Since received message is contract information, the CPU 21 need not perform call alarming by the LED 31 or buzzer 33 as in the case of individual or group calling. Note that ON/OFF setting of call alarming may be performed by a user for each address.

In this manner, the CPU 21 stores the message included in the message codeword next to the address assigned thereto to the corresponding storage area and displays the message on the display 14. When a start bit (message bit) of the supplied codeword becomes "0", i.e., another address codeword begins, the CPU 21 sends a signal SB to the battery save signal decoder 46. In response to the signal SB, the decoder 46 releases the continuous ON state of the switch $SW_2$ to restore the normal intermittent reception operation.

An operation of the CPU 21 will be described below.

FIG. 12 is a flow chart showing an operation of the CPU 21. The CPU 21 is normally supplied with power from the power source 26 regardless of the ON/OFF state of the main switch $SW_1$ and waits for message reception, supply of a count timing signal, or supply of a key input signal (step G1). When a message is received, the CPU 21 performs incoming processing (G2). The incoming processing will be described later. When a count signal is supplied from the timer circuit 35, the CPU 21 performs count/timer processing (G3). The count processing is to obtain current time information. More particularly, the CPU 21 increments the contents of the timer register T1 by one when the CPU 21 receives a timing signal from timer circuit 35. The timer processing is to stop the alarming (i.e., indicating of the message reception) performed by the LED 31 or the buzzer 33, and stop the displaying of information except displaying of the current time, upon lapse of a predetermined time period. More particularly, after the alarming or the displaying are performed in the incoming processing and the key processing to be described later, the CPU 21 increments the contents of the timer register T2. When contents of the timer register T2 achieve to a predetermined value, the CPU 21 stops the alarming and the displaying. When a key input signal is supplied from the switch circuit 28, the CPU 21 performs key processing (G4). The key processing will be described later.

When the CPU 21 determines o the basis of the above operation of the decoder 24 that the received address is address assigned thereto, it executes the incoming processing G2.

The incoming processing will be described in detail below with reference to FIG. 13.

The CPU 21 temporarily sets an address type information (information from address processor 65), and message data in the buffer register BR of the message memory 28. When reception of the message is finished, the CPU 21 sends the signal SB to the battery save signal decoder 46 to intermittently turn on the switch $SW_2$ (step A1). The CPU 21 checks on the basis of the address type information, i.e., the parallel bit signal from the address processor 65 whether the received address coincides with the addresses set in the address registers 51 and 52 or coincides with the addresses set in the address registers 53 to 56 (step A2).

If the received address coincides with any one of the addresses set in the address registers 51 and 52, the control flow advances to step A3. In this case, an individual calling signal is received. As described above, in order to prevent erroneous reception, a message of the same contents is transmitted from the base station twice in 60 seconds. For this reason, the CPU 21 checks in step A3 whether current reception is the second reception of the same contents (repeat call). If the current reception is the repeat call, the CPU 21 clears the buffer register BR (step A9) to end the incoming processing. If the current reception is not the repeat call, the CPU 21 stores the address type information, message stored in the buffer register BR and reception time data (the contents of timer register T1) in the normal message memory UM (step A4). The CPU 21 checks whether the buzzer 32 is set to generate a sound upon message reception (step A5). If the buzzer 33 is set not to generate a sound, the flow advances to step A7. If the buzzer 33 is set to generate a sound, the CPU 21 sends a control signal to the buzzer driver 32 to drive the buzzer 33 (step A6). In step A7, the CPU 21 causes the LED driver 30 to drive the LED 31, thereby flashing the LED 31. Thereafter, the CPU 21 displays the address type information, message, and the like stored in the normal message memory UM and related to the current reception on the display 14 (step A8) and ends the incoming processing.

If the received address coincides with any one of the addresses set in the address registers 53 to 56 in step A2, the control flow advances to step A10. In this case, contract information is received. That is, a calling signal for transmitting a message to a plurality of paging receivers regardless of assigned frames is received. In step A10 the CPU 21 checks whether the information type code in the message coincides with any one of the information types stored in the information type memory KM of the ROM card 27. If a noncoincidence is determined, this indicates that the reception data is not information to be received by this paging receiver. Therefore, the data in the buffer register is cleared (step A9), and the incoming processing is ended. For example, assume that a gold quotation receiving address is stored in the memory AM of the ROM card 27 in order to receive gold quotation information. The information service contract, however, is made for only two gold quotation at Tokyo and London, and therefore only code data representing Tokyo gold quotation information and London gold information is stored in the ROM 27. In this case, if the current reception data represents New York gold quotation information, this data is not received as described above. If the coincidence is detected in step A10, the control flow advances to step A11. In step A11, the CPU 21 checks whether the current reception is the repeat call, as in step A3.

If the current reception is the repeat call, the CPU 21 executes the processing in step A9 and ends the incoming processing. If the current reception is not the repeat call, the CPU stores the received address type information, message, and the reception time in the contract information memory of the message memory 28 (step A12) and ends the incoming processing. At this time, the CPU 21 checks the address type information and information type code, and stores the reception data and reception time in an empty area of the contract information memory PM corresponding to the received contents. When gold quotation information of Tokyo is received, for example, the CPU 21 stores the reception data in the start address of an empty area of the first contract information memory PM1. Similarly, when gold quotation information of London or stock quotation information of Tokyo is received, the CPU 21 stores the reception data in the start address of an empty area of the second or third contract information memory PM2 or PM3.

Key processing will be described below with reference to FIG. 14.

In response to a switch operation signal from the switch circuit 29, the CPU 21 executes switch processing shown in FIG. 14.

An operation of the main switch SW1 is detected in step S50 via steps S1, S20 and S35. In step S51, the CPU 21 supplies a start signal SK to the ID-ROM control decoder 47 and supplies a control signal SB to the battery save signal decoder 46. As a result, the decoder 44 executes the preamble detection operation.

An operation of the mode switch SW3 is detected in step S1, and the CPU 21 increments the count value of the mode counter M by one. As a result, if the contract information display mode (M=1) is set, the control flow advances to step S4 to set the row address Rx in the display pointer P. The CPU 21 causes the timer T2 to start a timer operation (step S5). Thereafter, the contents of the register X designated by the display pointer P, i.e., the type of information and the like are displayed on the display 14 (step S6). This display continues until the contents of the timer T reaches the predetermined value in the count/timer processing G3 o until other key is operated.

If the time correction mode (M=2) is set by mode switching in step S2, the control flow advances to step S11 via steps S3 and S10. In step S11, the flag F3 is set. As a result, a digit to be corrected is set to a digit of seconds. The CPU 21 sets a row address R0 in the display pointer P, designates the timer register T1 (step S13), and stops an operation of the timer T2 (step S14). The CPU 21 displays a current time registered in the timer register T designated by the display pointer P on the display 14 (step S6).

If the normal mode (M=0) is set by mode switching in step S2, the control flow advances to step S12 via steps S3 and S10. In step S12, the flags F1 to F3 are reset. The CPU 21 sets the row address R0 in the display pointer P, designates the timer register T1 (step S13), and stops an operation of the timer T2 (step S14). The CPU 21 displays a current time registered in the timer register T1 designated by the display pointer P on the display 14 (step S6).

If the operated key is the switch SW4, this is detected in step S20 via step S1. The control flow advances to step S21 to check a current mode. If the current mode is the normal mode (M=0), the flow advances to step S22 via step S21. In step S22, the CPU 21 increments the value of the display pointer P by one to set the row designated by the pointer P as a row for the next row address. Note that if the value of the display pointer P is larger than the last row address of the normal message memory UM, i.e., R20, the CPU 21 sets the row address R1 in the display pointer P (steps S23 and S24). After the above processing, the CPU 21 starts the timer operation (step S5) and displays a message stored in the row of the normal message memory UM designated by the pointer P on the display 14 (step S6). As described above, when the switch SW4 is operated in the normal mode, messages of the respectively rows of the normal message memory UM are sequentially displayed on the display 14.

If the switch SW4 is operated in the contract information display mode (M=1), the flow advances to step S26 via steps S1, S20, S21, and S25. In step S26, the CPU 21 checks whether the display pointer P designates the row address Rx, i.e., the register X. If the pointer P designates the register X, the row address XR set in the register X is set in the pointer P (step S29). The timer T2 is started (step S5), and information in the row designated by the pointer P, i.e., the row of the address XR, i.e., received specific contract information is displayed on the display 14 (step S6).

If the CPU 21 determines in step S26 that the display pointer P does not designate the register X, the value of the pointer is incremented by one, and the pointer P designates the next row (step S27). If the designated value of the display pointer P is larger than the last row address (XR+9), this is detected (step S28), and the row address XR set in the register X is set in the pointer P (step S29). The timer T2 is started (step S5), and information in the row designated by the pointer P, i.e., the row of the addresses XR to (XR+9), i.e., received specific contract information is displayed on the display 14 (step S6).

If the switch SW4 is operated in the time correction mode (M=2), the flow advances to step S30 via steps S1, S20, S21, and S25. In step S30, a set flag of the flags F1 to F3 is changed, a digit to be corrected is shifted, and the flow advances to the display processing (step S6).

If the switch SW5 is operated, the flow advances to step S35 via steps S1 and S20. In step S35, the CPU checks a current mode. If the current mode is the contract information display mode (M=1), the flow advances to step S37. In step S37, the value of the pointer Q is incremented by one. As a result, if the value of the pointer Q becomes larger than the last row address 15 of the information type memory KM of ROM card 27, the value of the pointer Q is reset to an initial value "6" (steps S38, S39). After the above processing, an information type code and a row address (start row address of the contract information storing area) of predetermined rows of the ROM card 27 designated by the pointer Q are written in the register X (step S40). The row address Rx is set in the display pointer P (step S41). Thereafter, the flow advances to step S6 via step S5, and the information type and the like selected by the pointer Q are displayed on the display 14. That is, when the switch SW5 is operated in the normal mode, information types stored in an area of the sixth to fifteenth rows of the ROM card 27 and the start addresses of the contract information memories PM1 to PM10 which store the information of the types, are sequentially displayed on the display 14.

If the switch SW5 is operated in the time correction mode, time correction is executed, and a corrected current time is displayed on the display 14 (steps S35, S36, S45, S46).

In response to a time elapse signal from the timer circuit 35, the CPU 21 updates the values of the timer registers T1 and T2 in the message memory 27.

In this embodiment, the ROM card 27 stores the addresses and the information type codes. However, the ROM card 27 may store only the addresses. Alternatively, the ROM card 27 may store only the information type codes, while all the addresses are stored in the ID-ROM 25. Similarly, the ROM card 27 may store all the reception control information including all of the addresses, frame data, and information type data, thereby omitting the ID-ROM 25.

In addition, the type, contents, and number of receivable contract information are not limited to those of the above embodiment.

As described above, according to this embodiment, the reception control data for receiving the information service is stored in the detachable memory means. Therefore, the reception control data can be easily changed, e.g., the type of receivable information service and the contents of information can be easily changed.

2nd Embodiment

A second embodiment of the present invention will be described in detail below.

In the second embodiment, the number of remaining receivable times representing how may times an information service can be received is stored in a ROM card 27 as reception control data. Each time the information service is received, the number of receivable times is reduced. When the number is reduced to "0", no more information can be received. In this manner, the number of charge troubles related to contract information reception can be reduced.

In the second embodiment, a signal format, a base station arrangement, an outer appearance of a paging receiver, and a basic arrangement of internal circuits are substantially the same as those in the first embodiment, and a detailed description thereof will be omitted.

FIG. 15 is a memory map showing an arrangement of a ROM card 27 according to the second embodiment. A memory area of the ROM card 27 is constituted by a plurality of rows. Memory areas from the first to fourth rows constitute an address data memory AM as in the first embodiment. A memory area of the fifth row stores a frame number for receiving an information service. A memory area of the sixth row constitutes a remaining reception number memory NM and stores remaining reception number data representing how many times contract information can be received. The remaining reception number memory NM initially stores a total number of information services receivable on the basis of the contract between an information service company and an information receiving party. Each time the receiving party receives an information service (i.e., each time a paging receiver receives contract information), the currently stored number is electrically decremented by one. Memory areas from the seventh to tenth rows construct an information type memory KM same as the first embodiment. In this embodiment, one information type corresponds to one address. For this reason, an information type memory KM includes 4 rows.

An operation of the paging receiver having the above arrangement will be described below with reference to FIG. 16. An operation of a decoder, a general flow of a basic operation of a CPU 21, and a key processing flow are the same as those shown in FIGS. 12 and 14. Therefore, only incoming processing which characterizes the second embodiment will be described.

Figure 16:
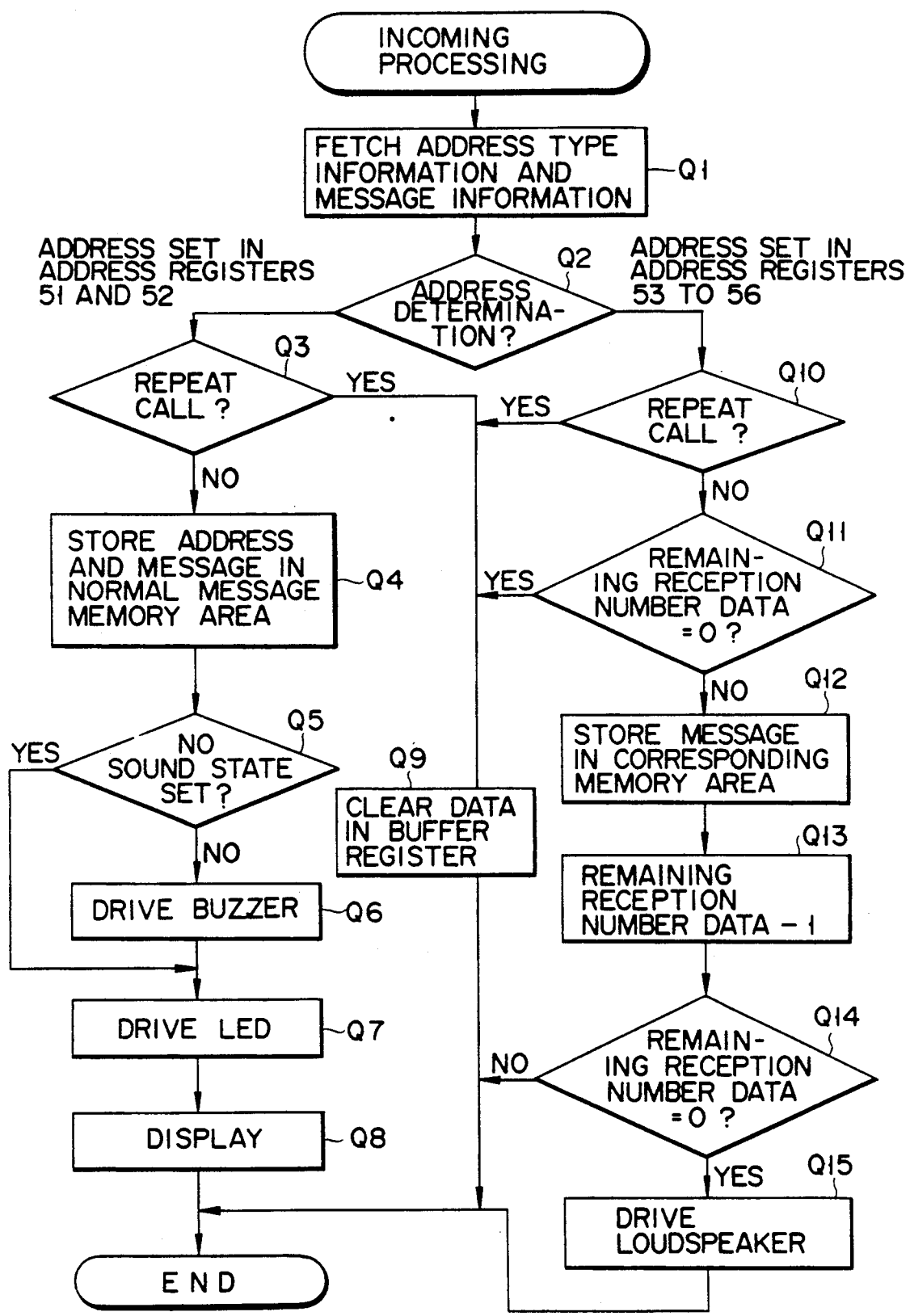
FIG. 16 is a flow chart for explaining incoming processing of a paging receiver according to the second embodiment of the present invention.

When the CPU 21 determines on the basis of an operation of a decoder 24 that a reception signal is a calling signal assigned to its own receiver, the CPU 21 executes incoming processing shown in FIG. 16. Steps Q1 to Q9 in this incoming processing are the same as steps A1 to A9 in the incoming processing shown in FIG. 13, and a detailed description thereof will be omitted.

In step Q2, if the CPU 21 determines that a received address coincides with any one of addresses set in address registers 53 to 56, a control flow advances to step Q10. In step Q10, the CPU 21 checks whether the calling signal is a repeat call. If the calling signal is the repeat call, the contents of a buffer register are cancelled in step Q9, and the incoming processing is ended. If the calling signal is not the repeat call, the flow advances to step Q11. In step Q11, the CPU 21 checks whether the value of the memory area NM of the sixth row in the ROM card 27 is 0. If the value is 0, this indicates that this receiver has already consumed the number of contracted reception times and can no longer receive contract information. Therefore, the processing in step Q9 is executed, and the incoming processing is ended without performing processing for displaying reception data or the like. If the receivable number data is one or more, this indicates that the contract information can be received. Therefore, the flow advances to step Q12. In step Q12, the message is stored in a corresponding memory area, as in step A12 shown in FIG. 13. The stored value of the remaining reception number memory NM is decremented by one (step Q13). Thereafter, the CPU checks whether the number of remaining reception times is 0 (step Q14). If the number of reception times is one or more, the incoming processing is ended. If the number of remaining reception times is 0, in order to alarm this, i.e., in order to alarm, to a user, that a new contract is required in order to receive and display information from the information service company, the CPU 21 causes a buzzer driver 32 to drive a buzzer 33. If necessary, a message representing this information is displayed.

Since the received messages are sequentially displayed on a display 14 upon operation of switches $SW_4$ and $SW_5$, the user can check the received messages. Note that the remaining reception number data may be displayed on the display 14 upon operation of the switches.

For example, if a program is prepared such that the CPU 21 checks in step Q14 whether the remaining reception number data is 10 or less, loudspeaker drive in step Q15 can also be utilized as an alarm representing that the number of remaining reception times is small.

In this embodiment, the remaining reception number data set in the ROM card 27 is decremented by one each time information is received. However, the reception number data may be incremented upon each reception. In this case, the remaining reception number data is set when a reception contract is made, and the CPU 21 checks in step Q11 whether the data reached a predetermined value.

As described above, according to the second embodiment, a detachable memory unit is mounted on a paging receiver, and the number of remaining receivable times representing how many times the unit can receive an information service is stored in this unit. Each time contract information is received, the number of remaining receivable times is decremented by one Therefore, a user can receive information in an amount corresponding to a charge, and an information service company can prevent nonpayment of the charge. As a result, a paging receiver capable of reducing the number of troubles in utilization charge in an information service can be provided. In this embodiment, a frame number, an address, and the like are stored in an external memory as reception control data. However, only the number of remaining receivable times may be stored in the external memory, while other data are stored in the ID-ROM 25.

3rd Embodiment

In the above first embodiment, contract information to be received is received and stored in the message memory regardless of whether an operator requires the information at this time. In the third embodiment, however, there is provided a paging receiver capable of selectively receiving and displaying information required by a user at this time.

A transmission format and an arrangement of a base station used in this embodiment are substantially the same as those described above with reference to FIGS. 1A to 1D and 2, and a detailed description thereof will be omitted.

Figure 17:
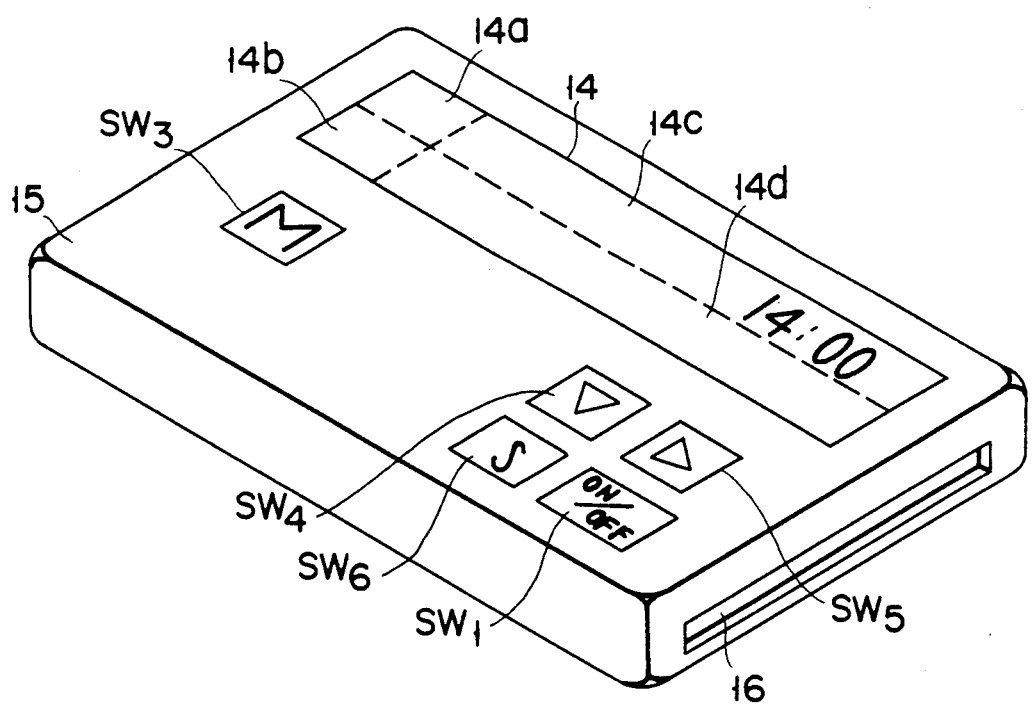
FIG. 17 is a perspective view showing an outer appearance of a paging receiver according to a third embodiment of the present invention.

As shown in FIG. 17, an outer appearance of a paging receiver according to the third embodiment is characterized in that a switch $SW_6$ is added to the arrangement shown in FIG. 3A. This switch $SW_6$ is used to switch and select the type of contract information to be received.

A circuit arrangement of the paging receiver according to the third embodiment is basically the same as that shown in FIG. 4. An arrangement of a decoder 24 according to this embodiment will be described below with reference to FIG. 18. As shown in FIG. 18, the arrangement of the decoder 24 of the third embodiment is basically the same as that shown in FIG. 5. In the third embodiment, however, only one address register for holding addresses for receiving contract information is provided, unlike in the arrangement shown in FIG. 5.

In this embodiment, therefore, an input signal to an OR gate 63 is a 3-bit parallel signal. An input signal to an address processor 65 is a 3-bit parallel signal from address comparators 57, 58, and 59 and a function bit included in a reception signal. An output signal from the address processor 65 is a 5-bit signal. A frame register 50 stores one frame number selected by a CPU 21 from a plurality of frame numbers stored in a ROM card 27 (a plurality of same frame numbers may be stored). Similarly, an address register 53 stores one address selected by the CPU 21 from addresses stored in the ROM card 27.

Figure 19:
FIG. 19 is a memory map showing an internal arrangement of a ROM card according to the third embodiment of the present invention.

FIG. 19 is a memory map showing an arrangement of the ROM card 27 according to the third embodiment. The ROM card 27 comprises an information type area IA, a RAM address area RA, an address data area DA, and a frame data area FDA having the same row addresses. Reception control data concerning one information type is assigned and stored in a memory area of each row. For example, as shown in FIG. 19, reception control data for receiving gold quotation information is stored in a row at the row address 1, and reception control data for receiving stock information is stored in a row at the row address 2. Each row in the information type area IA stores data representing the type of information assigned to the row. Each row in the RAM address area RA stores, when information assigned to the row is received, a start address (one of R21, R31, R41, ... and R111) of a memory area (contract information memories PM1 to PM10 shown in FIG. 20) of a message memory 28 in which the information is to be stored. Each row in the frame register area FDA stores the number of a frame to which information assigned to the row is transmitted. Each row in the address data area DA stores an address for receiving information assigned to the row.

Figure 20:
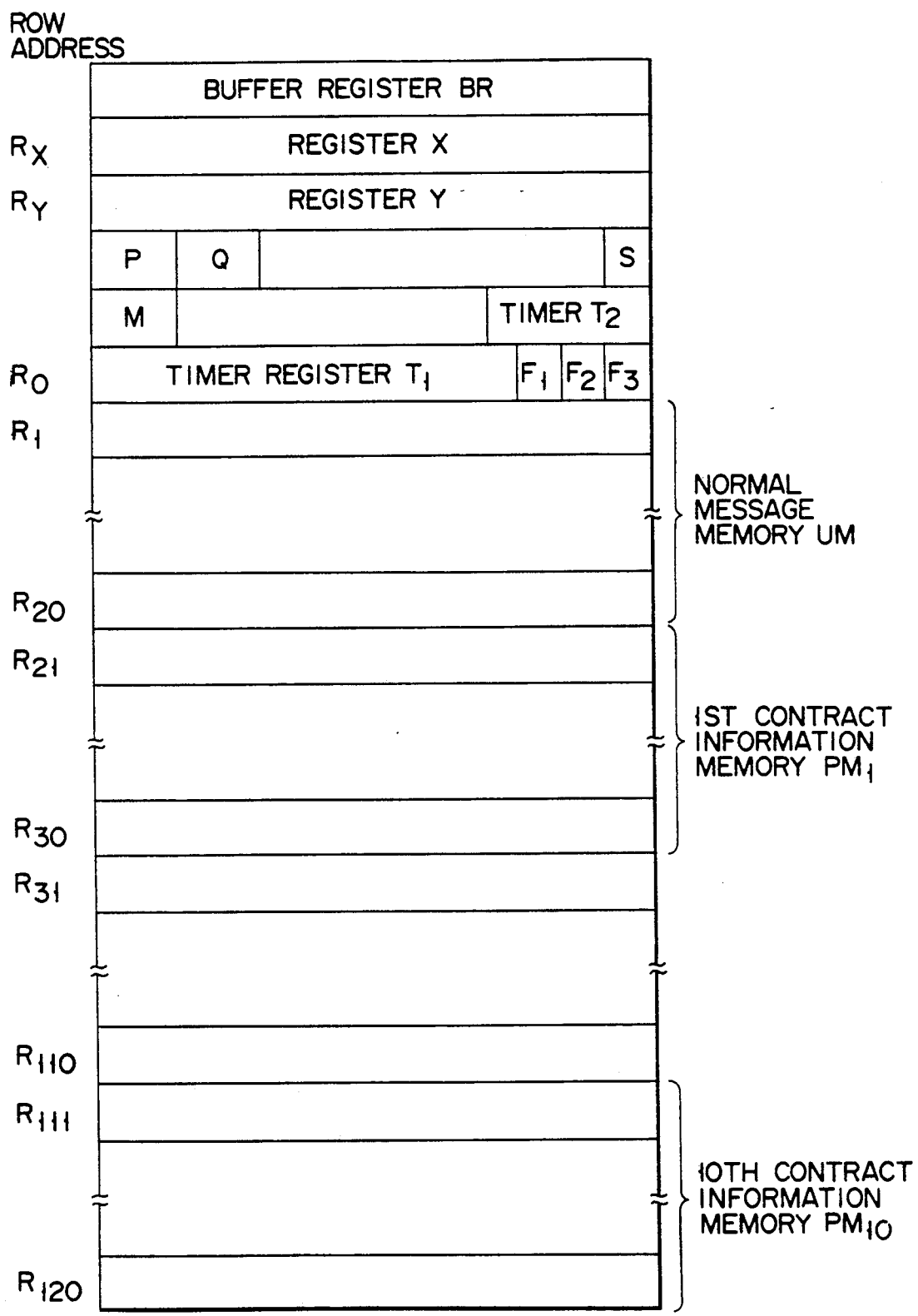
FIG. 20 is a memory map showing an internal arrangement of the message memory of the third embodiment.

FIG. 20 show a memory map of a message memory 28 of this embodiment. In this message memory 28, a register Y and a flag S are added to the construction of FIG. 9. The register Y stores information type data representing a type of the information which is set in receiving state and a start address of the contract information memory PM where received information of the type is stored. The flag S indicates whether the operation of the switch $SW_6$ (for switching type of information to be received) is first time or not. The flag S is set in response to the first operation of the switch $SW_6$. The flag S is reset upon laps of a predetermined time after the final operation of the switch $SW_6$ and an operation of another key.

An operation of the paging receiver according to the third embodiment having the above arrangement will be described below.

When a user turns on the switch $SW_1$ shown in FIG. 3, the CPU 21 detects this and sends a start signal SK to an ID-ROM control decoder 47 of the decoder 24. In response to this control signal, the ID-ROM 25 outputs storage data. As a result, address data, frame data, and AC retry data assigned to the paging receiver are set in address registers 51, 52, a frame register 49, and an SC retry register 48. In addition, when the ROM card 27 is mounted on the main body 15, under the control of the CPU 21, frame data and address data of a specific row of the ROM card 27 are selected and read out therefrom, and transferred to and set in the frame register 50 and the address register 53. The information type data and start address of the contract memory PM stored in the specific row are set in the register Y.

Thereafter, the CPU 21 sends a signal SB to a battery save signal decoder 46, and the decoder 46 starts a preamble search operation. After a preamble signal is detected, the above search code detection operation is performed. When a sync code SC is detected, a detection signal is supplied from a sync signal detector 43 to a timing controller 41. In response to this detection signal, the timing controller 41 sends a control signal to the battery save signal decoder 46 so that the switch $SW_2$ is set in an ON state only at a timing at which the sync code SC is supplied and at timings at which frames of the numbers set in the frame registers 49 and 50 are transmitted. As a result, power is supplied to a receiver 23 only at these timings (actually, the power is supplied to the receiver 23 about 8-bit time before the timings start). Therefore, when "2" is set in one of the frame registers 49 and 50 and "8" is set in the other, for example, the switch $SW_2$ is turned on/off as shown in FIG. 10C.

Thereafter, as in the above first embodiment, a reception operation for a calling signal and an operation for checking whether a reception signal is assigned to the corresponding paging receiver are executed.

An operation of the CPU 21 according to the third embodiment will be described below. A basic operation of the CPU 21 is the same as that shown in FIG. 11 and a detailed description thereof will be omitted.

Incoming processing of this embodiment will be described below with reference to FIG. 21.

Figure 13:
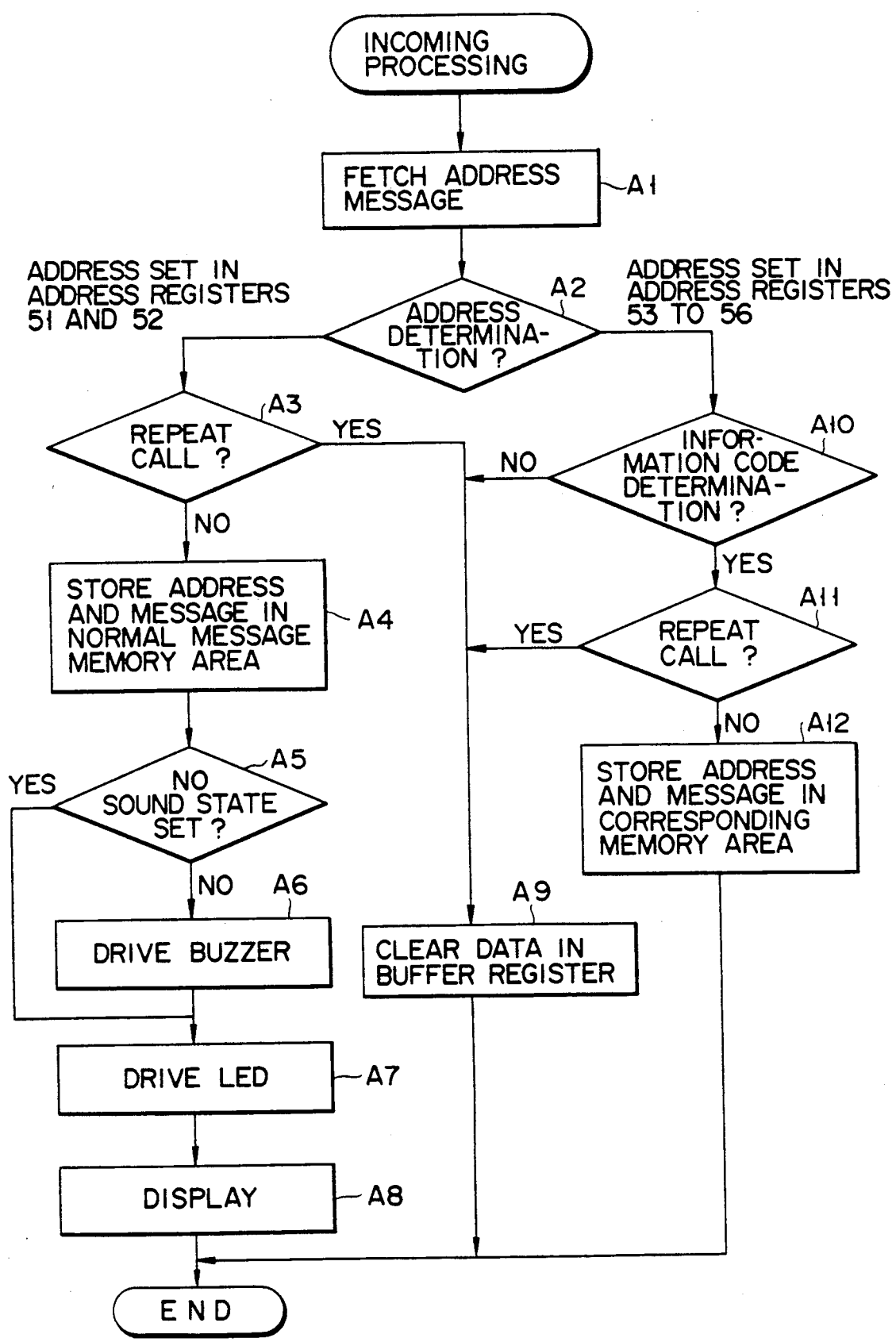
FIG. 13 is a flow chart for explaining incoming call processing of the paging receiver according to the embodiment of the present invention.
Figure 21:
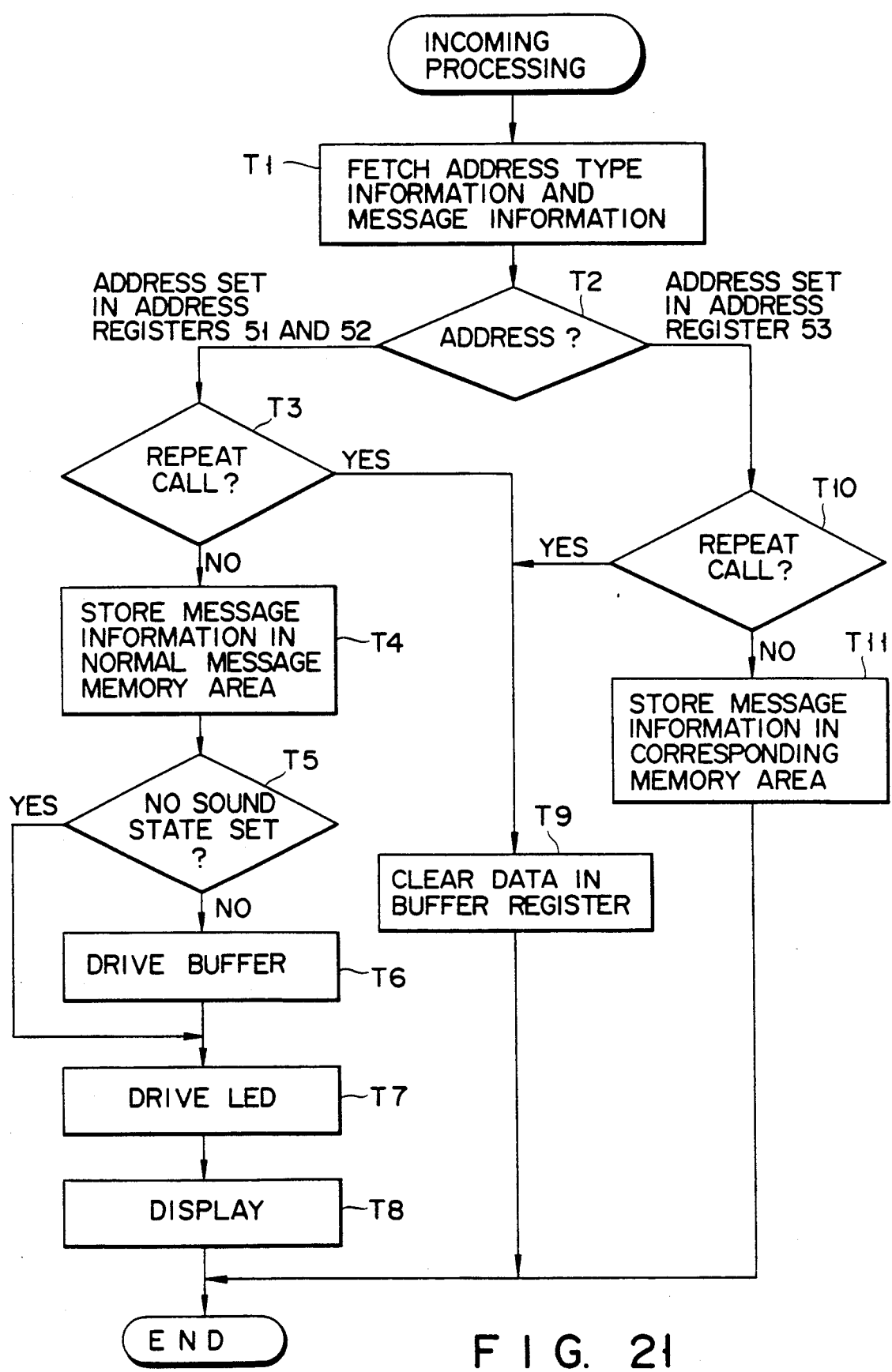
FIG. 21 is a flow chart for explaining incoming processing of the paging receiver according to the third embodiment of the present invention.

In the incoming processing shown in FIG. 21, steps T1 to T9 are the same as steps A1 to A9 shown in FIG. 13. If the CPU 21 determines in step T2 that a reception address coincides with the address stored in the address register 53, the control flow advances to step T10. In step T10, the CPU 21 checks whether the received calling signal is a repeat call. If the signal is the repeat call, processing in step T9 is executed. If the signal is not the repeat call, in step T11, the received contract information is stored in an empty area of a corresponding contract information memory in the message memory 28 on the basis of the start address stored in the register Y. More specifically, the contract information is written in an empty area of the contract information memory in the message memory 28 corresponding to an information type selected by the switch $SW_6$. That is, the contract information is stored in an empty area from the contract information memory areas PM1 to PM10 having, as a start address, an address stored in the RAM address area of a row of the ROM card 27 designated by a ROM pointer Q.

Figure 22:
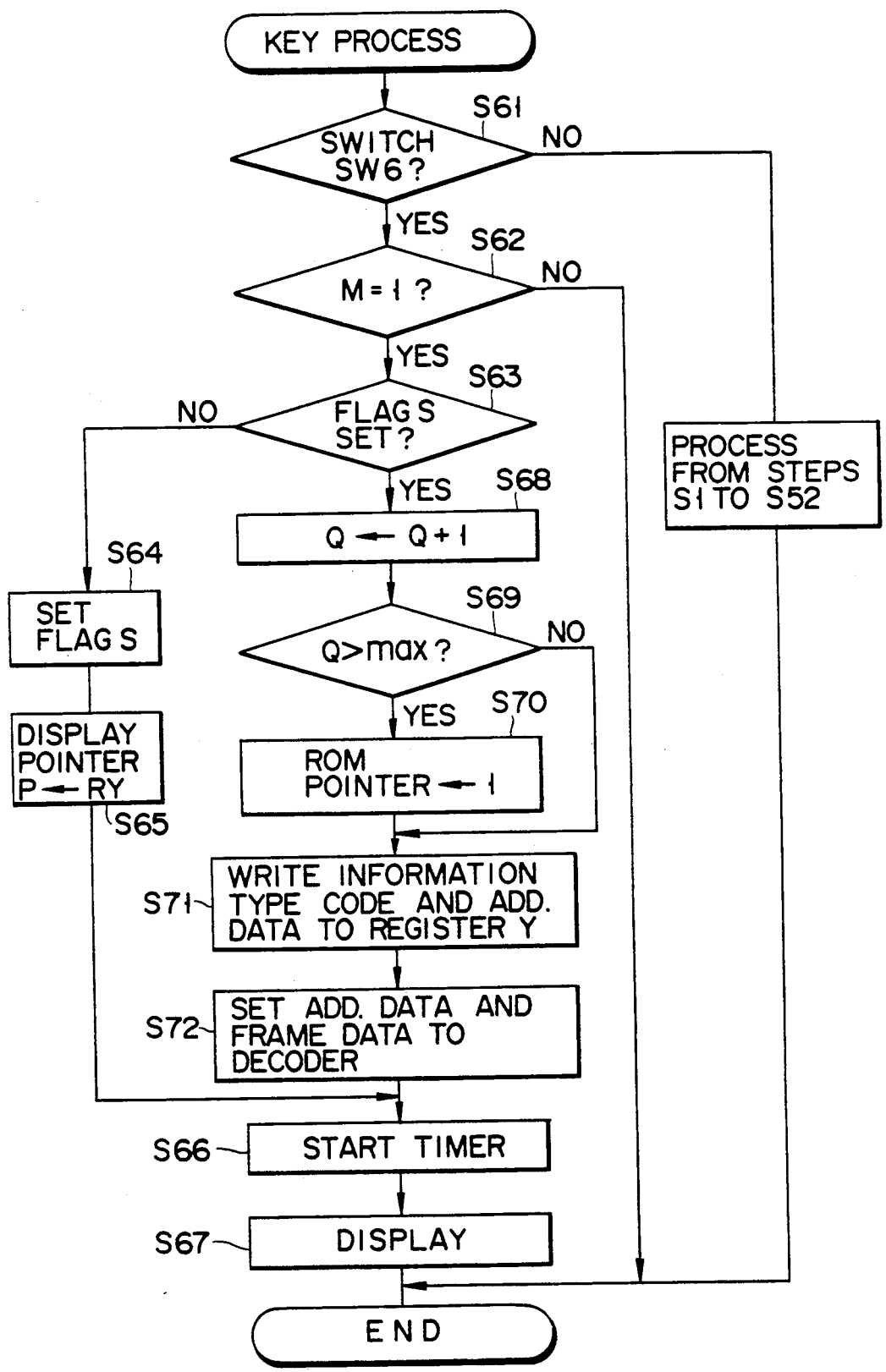
FIG. 22 is a flow chart for explaining key processing of the paging receiver according to the third embodiment of the present invention.

Key processing will be described below with reference to FIG. 22. In the key processing shown in FIG. 22, steps S1 to S52 are the same as the steps in the key processing shown in FIG. 14 according to the first embodiment. Therefore, key processing of the switch $SW_6$ which characterizes this embodiment will b described.

When the switch $SW_6$ is operated, this is detected in step S61. The CPU 21 then checks whether the system is in a contract information mode (M=1) (step S62). If a mode other than the contract information mode is set, the key processing ended. If the contract information mode is set, it is determined whether the flag S is set or not. If the flag S is not set, the flag S is set in step S64. A row address RY is set at the display pointer P in step S66. THE time counting operation of the timer register T2 is started in step S66. The information type now set in receiving state, i.e., contents of the register Y pointed by the pointer P are displayed on the display 14 in step 67.

If it is detected that the flag S is set in step S63, the contents of the ROM pointer Q is increased by one. When updated contents of the ROM pointer Q is greater than ten, i.e., the last row address of the ROM card 27, the contents of the ROM pointer Q is reset to one in steps S69 and S70.

The CPU 21 reads out the information type data and the start address (either of R21 to R111) of the contract information memory PM from the specific rows of the information type area IA and the RAM address area RA. The CPU 21 stores the read out data in the register Y of the message memory 28 in step S71. The CPU 21 reads out the frame data and the address data from the specific rows of the frame data area FDA and the address data area of the ROM card 27. The CPU 21 store the read out data in the frame register 50 and the address register 53 of the decoder 24 in step S72. Thereby, newly selected contract information, i.e., the contract information corresponding the row indicated by the ROM pointer Q is received.

After the above processing, the timer processing of step S66 and the display processing of step S67 are performed. Since display pointer P is still pointing the resister Y, the information type selected by the operation of the switch $SW_6$, i.e., the information type data stored in the register Y are displayed on the display 14 in step S67.

Therefore, if an operator wants to confirm the information type being in the receiving state, the operator sets the paging receiver in the contract information display mode by the switch $SW_3$, and operates the switch $SW_6$ one time. If the operator wants to change the information type being in the receiving state, operator sets the paging receiver in the contract information display mode by the switch $SW_3$, and operates the switch $SW_6$ at least two times until desired information type is displayed on the display 14.

In this embodiment, since only one frame register and one address register are required to receive contract information, the number of hardware components can be reduced. In addition, by changing and setting the reception control data stored in the ROM card 27 in the frame register 50 and the address register 53 in accordance with, e.g., a time, only necessary information can be selectively received. Furthermore, even if contract information to be received is transmitted by different frames, only two frames are received. As a result, the batteries can be effectively saved.

As described above, according to the third embodiment, the CPU 21 selects one of a plurality of reception control data stored in the ROM card and sets the selected data in the decoder 24. Therefore, even if a large number of reception contracts are made, only information required at this time can be received. In addition, when a large number of pieces of contract information are transmitted by a plurality of frames, batteries can be saved.

The present invention is not limited to the above embodiments. For example, the above first to third embodiments may be combined. That is, the remaining reception number memory NM may be added to the ROM card having the arrangement shown in FIG. 8 so that reception of the contract information according to the first embodiment can be performed by the number of times stored in the remaining reception number memory NM. Similarly, a combination of the second and third embodiments can be arbitrarily made.

What is claimed is:

1. A paging receiver having a receiver main body and external memory means, wherein said receiver main body comprises:
   frame register means for storing numbers of frames;
   address register means for storing addresses;
   receiving means for receiving and demodulating a radio signal;
   reception control means coupled to said receiving means for operating said receiving means, on the basis of reception control data, in a predetermined period including a period in which a frame stored in said frame register means is transmitted;
   address checking means for checking whether an address included in an address codeword received by said receiving means coincides with an address stored in said address register means;
   means for continuously turning on said receiving means and fetching a message codeword when a coincidence is detected by said address checking means;
   internal memory means for storing the number of a frame to which an individual calling signal assigned to said receiver is transmitted and an address signal assigned to said receiver;
   setting means for setting a frame position number and the address stored in said internal and external memory means in said frame and address register means;
   said external memory means comprising storing means detachably mounted in said receiver main body for storing a frame position number and an address for receiving contact information supplied from an information service company, said storing means being accessible by said setting means when said storing means is mounted in said receiver main body;
   said reception control data including remaining reception number data representing the number of times capable of receiving the contract information; and
   said paging receiver further comprising:
   updating means for updating the remaining reception number data each time said paging receiver receives the contract information; and
   inhibiting means for inhibiting said paging receiver from receiving the contract information when the remaining reception number data reaches a predetermined value.

2. A paging receiver comprising:
   a receiver main body comprising:
   reception control means for controlling said receiving means on the basis of reception control data;
   checking means for checking whether the paging calling signal received by said receiving means is assigned to said receiver;
   fetching means for fetching a message next to the calling signal determined to be assigned to said receiver by said checking means; and
   memory means for storing the reception message, and
   external memory means, detachably mounted in said receiver main body, for storing at least a part of the reception control data, and for supplying the reception control data stored therein to at least one of said reception control means and said checking means while said external memory means is mounted in said receiver main body;
   said reception control data including remaining reception number data representing the number of times capable of receiving the contract information; and
   said paging receiver further comprising:
   updating means for updating the remaining reception number data each time said paging receiver receives the contract information; and
   inhibiting means for inhibiting said paging receiver from receiving the contract information when the remaining reception number data reaches a predetermined value.

3. A receiver according to claim 2, wherein said external memory means has a card-like shape and is stored in said receiver main body while said external memory means is mounted in said receiver main body.

4. A receiver according to claim 2, wherein said receiver main body includes an external memory for storing reception control data,
   said external memory means stores reception control data for receiving contract information provided from an information service company, and
   said internal memory means stores reception control data for receiving an individual calling signal.

5. A receiver according to claim 2, wherein the reception control data further includes frame data representing a frame position number on a transmission format and address data for receiving a message,
   said external memory means includes means for storing the frame position number of a frame in which the contract information is transmitted and address data for receiving the contract information, and
   said internal memory means includes means for storing the frame position number of a frame assigned to said paging receiver and address data assigned to said paging receiver.

6. A receiver according to claim 2, wherein the reception control data includes frame data further representing the frame position number of a frame to be received by said receiver, and address data for receiving a message.

7. A receiver according to claim 2, wherein said paging receiver further comprises readout means for reading out the reception control data stored in said external memory means, designating means for designating a type of contract information to be received, and internal memory means for storing the readout reception control data, said readout means reading out only one reception control data for receiving the contract information designated by said designating means from the reception control data stored in said external memory means and setting the readout data in said internal memory means.

8. A receiver according to claim 2, wherein said receiver main body comprises:
   frame register means for storing position numbers of frames;
   address register means for storing addresses;
   a receiving circuit for receiving and demodulating a radio signal;
   reception control means for operating said receiving circuit in a predetermined period including a period in which a frame stored in said frame register means is transmitted and a period in which a sync code is transmitted;

address checking means for checking whether an address included in an address codeword received by said receiving circuit coincides with an address stored in said address register means;

means for continuously turning on said receiving circuit and fetching a message codeword when a coincidence is detected by said address checking means; and readout means for, when said external memory means is set in said receiver main body, reading out at least a part of reception control data stored in said external memory means, and for setting the readout data in at least one of said frame and address register means.

9. A receiver according to claim 8, wherein said readout means further includes internal memory means for storing reception control data including a frame and an address for receiving an individual calling signal, and said readout means includes setting means for setting the frame position number and the address stored in said internal memory means in said frame and address register means.

10. A paging receiver for receiving a paging signal assigned thereto supplied from a base station and for processing the received paging signal in accordance with reception control data, the paging receiver comprising:

a receiver main body;

external memory means, detachably mounted in said receiver main body, for storing at least a part of the reception control data, and for supplying reception control data stored therein to said receiver main body while said external memory means is mounted in said receiver main body;

the reception control data including remaining reception number data representing the number of times said paging number is capable of receiving the contract information; and said paging receiver further comprising:

updating means for updating the reception number data each time the contract information is received; and inhibiting means for inhibiting said paging receiver from receiving the contract information when the reception number data reaches a predetermined value.

11. A receiver according to claim 10, wherein said external memory means is card-shaped.

12. A receiver according to claim 10, wherein said receiver main body includes internal memory means for storing reception control data for receiving a calling signal for individual calling, and said external memory means store includes means for storing reception control data for receiving contract information provided from an information service company.

13. A receiver according to claim 10, wherein the reception control data includes frame data representing the position number of a frame to be received by said receiver, and address data for receiving a message.

14. A receiver according to claim 10, wherein said paging receiver further comprises designating means for designating a type of contract information to be received, and said external memory means supplies, to said paging receiver, only one reception control data for receiving the contact information designated by said designating means from the reception control data stored therein.

15. A paging receiver including a receiver main body and external memory means which is electrically disconnectable from said receiver main body, wherein:

said external memory means includes means for storing a first frame position number and a first address for receiving a contract information unit from an information service company; and said receiver main body comprises:

frame register means for storing a second frame position number;

address register means coupled to said frame register means for storing a second address;

receiving means for receiving and demodulating a radio signal;

processor means including first reception control means coupled to said receiving means for enabling said receiving means to receive one or more address signals by driving said receiving means during a first period of time in which a frame corresponding to the first frame position number stored in said external memory means is transmitted, as well as during a second period of time in which a frame corresponding to the second frame position number stored in said frame register means is transmitted, said processor means being coupled to said external memory means when the external memory means is connected to the receiver main body;

address checking means coupled to said address register means and including means for checking an address indicated by an address signal which is received by said receiving means during said first and second periods of time, and means for detecting whether the address indicated by said address signal coincides with either of the first address stored in said external memory means and the second address stored in said address register means;

said processor means also including second reception control means for continuously turning on said receiving means and fetching message code words when said address checking means detects a coincidence; and display means coupled to said processor means for displaying a message included in the message code word fetched by said second reception control means.

16. A paging receiving according to claim 15, wherein said external memory means is card-shaped and is housed in said receiver main body in a fitted manner.

17. A paging receiver according to claim 15, wherein said receiver main body further comprises internal memory means for storing the message included in said message code words fetched by said second reception control means, the message stored in said internal memory means being displayed on said display means.

18. A paging receiver according to claim 15, wherein said external memory means includes means for storing the number of a frame containing said contract information unit, as well as a plurality of address data items used for reception of a plurality of contract information units.

19. A paging receiver according to claim 15, wherein:

said external memory means further includes means for storing reception number data representing the number of times said contract information unit can be received; and said processor means includes:

updating means for updating said reception number data when said external memory means is connected to the receiver main body and said address checking means detects coincidence between the first address stored in said external memory means and an address indicated by an address signal which is received by said reception means during said first period of time; and inhibiting means for, when said reception number data reaches a predetermined value, inhibiting the signal receiving operation of said receiving means during said first period of time.

20. A paging receiver according to claim 19, wherein said updating means subjects a subtraction said reception number data representing the number of times said contract information unit can be received, each time contract information is received, thereby obtaining remaining reception number data representing the remaining number of times said contract information unit can be received.

21. A paging receiver according to claim 15, wherein said external memory means comprises a memory area in which are stored a plurality of address data items used for reception of a plurality of contract information units.

22. A paging receiver according to claim 21, wherein said external memory means comprises a memory area in which are stored a plurality of frame position number data items corresponding to said plurality of address data items used for reception of a plurality of contract information units.

23. A paging receiver according to claim 15, wherein the processor means of said receiver main body further comprises register means for reading out the first address stored in said external memory means and for storing the read-out address, in the condition wherein said external memory means is electrically connected to said receiver main body.

24. A paging receiver according to claim 15, wherein said external memory means is card-shaped.

* * * * *